(12) United States Patent
Dunfee et al.

(10) Patent No.: US 11,372,014 B2
(45) Date of Patent: Jun. 28, 2022

(54) CLINICAL ANALYZER PROBE CRASH DETECTION MECHANISM AND PROCESS

(71) Applicant: Siemens Healthcare Diagnostics Inc., Tarrytown, NY (US)

(72) Inventors: William D. Dunfee, Newark, DE (US); Amanda H. Schaffers, Cary, NC (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 794 days.

(21) Appl. No.: 16/095,912

(22) PCT Filed: May 11, 2017

(86) PCT No.: PCT/US2017/032163
§ 371 (c)(1),
(2) Date: Oct. 23, 2018

(87) PCT Pub. No.: WO2017/197116
PCT Pub. Date: Nov. 16, 2017

(65) Prior Publication Data
US 2021/0223277 A1    Jul. 22, 2021

Related U.S. Application Data

(60) Provisional application No. 62/335,349, filed on May 12, 2016.

(51) Int. Cl.
*G01N 35/10* (2006.01)
*G01N 35/00* (2006.01)

(52) U.S. Cl.
CPC ... *G01N 35/1011* (2013.01); *G01N 35/00623* (2013.01); *G01N 35/109* (2013.01); *G01N 35/1079* (2013.01)

(58) Field of Classification Search
CPC ......... G01N 35/1011; G01N 35/00623; G01N 35/109; G01N 35/1079
(Continued)

(56) References Cited

U.S. PATENT DOCUMENTS 3,754,444 A * 8/1973 Ure .................. G01N 35/00732
73/863.01
3,883,305 A * 5/1975 Hoskins ............... G01N 35/021
422/65

(Continued)

FOREIGN PATENT DOCUMENTS

DE    10 2008 058 067 A1    5/2010
EP    2793031     * 10/2014
(Continued)

OTHER PUBLICATIONS

Extended EP Search Report dated May 20, 2019 of corresponding European Application No. 17796842.7, 4 Pages.
(Continued)

*Primary Examiner* — Arlen Soderquist

(57) ABSTRACT

Embodiments are directed to a transfer arm with a probe and a crash detection mechanism for use in a clinical analyzer in an in vitro diagnostics environment. The mechanism requires no user-intervention after a collision event, unless the automated inspection mechanism determines that damage to the probe requires probe replacement. Moreover, the mechanism is capable of protecting the probe, in some instances, from damage during a collision. The mechanism provides for automatic resetting after a collision, self-checking, and alignment correction. The mechanism includes a crash detection printed circuit assembly with a switch, and a spring-loaded contact sensor assembly configured to secure a probe within the transfer arm and allow for electrical connection between the switch and the probe during
(Continued)

normal operation and electrical disconnection between the switch and the probe upon contact of the probe with an obstruction.

23 Claims, 16 Drawing Sheets

(58) Field of Classification Search
USPC .......................................................... 422/67
See application file for complete search history.

(56) References Cited

U.S. PATENT DOCUMENTS

| | | | |
|---|---|---|---|
| 4,276,260 A * | 6/1981 | Drbal ................. | B01F 11/0082 141/130 |
| 4,451,433 A * | 5/1984 | Yamashita ....... | G01N 35/00663 422/509 |
| 5,045,286 A * | 9/1991 | Kitajima ............... | G01F 23/245 422/518 |
| 5,443,791 A * | 8/1995 | Cathcart ............. | B01L 3/50825 422/561 |
| 5,855,851 A * | 1/1999 | Matsubara ........... | G01F 23/263 422/511 |
| 5,895,630 A | 4/1999 | Skaborn et al. | |
| 6,171,280 B1 * | 1/2001 | Imazu ................ | G01N 35/1079 604/118 |
| 6,270,726 B1 * | 8/2001 | Tyberg ............... | G01N 35/1011 422/509 |
| 6,447,728 B1 * | 9/2002 | Wilmes ................. | G01N 35/10 422/564 |
| 6,551,558 B1 * | 4/2003 | Mann ...................... | G01F 23/24 116/109 |
| 2005/0013744 A1 * | 1/2005 | Nagai ................ | G01N 35/1016 422/400 |
| 2005/0194394 A1 * | 9/2005 | Ueda .................. | G01N 35/1011 221/4 |
| 2007/0012123 A1 | 1/2007 | Li et al. | |
| 2007/0065945 A1 * | 3/2007 | sIGRIST ............ | G01N 35/1011 436/43 |
| 2007/0104615 A1 * | 5/2007 | Hanafusa .......... | B01L 3/502715 422/65 |
| 2008/0156117 A1 | 7/2008 | Londo et al. | |
| 2009/0226344 A1 * | 9/2009 | Nishida .............. | G01N 35/1011 422/67 |
| 2011/0036188 A1 * | 2/2011 | Fujioka ................... | F16H 35/10 74/405 |
| 2011/0151504 A1 * | 6/2011 | Avantsa ................. | G01N 1/312 435/40.5 |
| 2012/0024055 A1 * | 2/2012 | Knight .................. | G01F 23/263 73/304 C |
| 2012/0045366 A1 * | 2/2012 | Katsumi ............ | G01N 35/1011 422/67 |
| 2012/0156098 A1 * | 6/2012 | Sano ...................... | G01N 35/10 422/68.1 |
| 2013/0345894 A1 * | 12/2013 | Haddad .............. | G01N 35/1011 700/302 |
| 2014/0065017 A1 * | 3/2014 | Herz ...................... | G01N 35/10 422/63 |
| 2014/0093426 A1 * | 4/2014 | Hirano ............... | G01N 35/1011 422/67 |
| 2014/0199779 A1 * | 7/2014 | Yasui .................. | G01N 35/1011 436/180 |
| 2014/0271405 A1 | 9/2014 | Wilmes | |
| 2016/0320424 A1 * | 11/2016 | Antonio ............. | G01N 35/1011 |
| 2016/0327587 A1 * | 11/2016 | Yasui .................. | G01N 35/1011 |
| 2016/0341755 A1 * | 11/2016 | Wilmes ................. | G01N 35/10 |
| 2017/0003242 A1 * | 1/2017 | Wiedekind-Klein ........................ G01N 33/48785 |

FOREIGN PATENT DOCUMENTS

| | | | |
|---|---|---|---|
| EP | 2793031 A1 | | 10/2014 |
| JP | 59-176946 U | * | 11/1984 |
| JP | S59-176946 U | | 11/1984 |
| JP | 7-43369 | * | 2/1995 |
| JP | H07-041464 U | | 7/1995 |
| JP | 2012-042294 A | | 3/2012 |
| JP | 2013-156089 A | | 8/2013 |
| JP | 2013-253993 A | | 12/2013 |
| WO | 2010/057862 A2 | | 5/2010 |
| WO | 2015/105079 A1 | | 7/2015 |

OTHER PUBLICATIONS

PCT International Search Report and Written Opinion dated Jul. 27, 2017 (10 Pages).

* cited by examiner

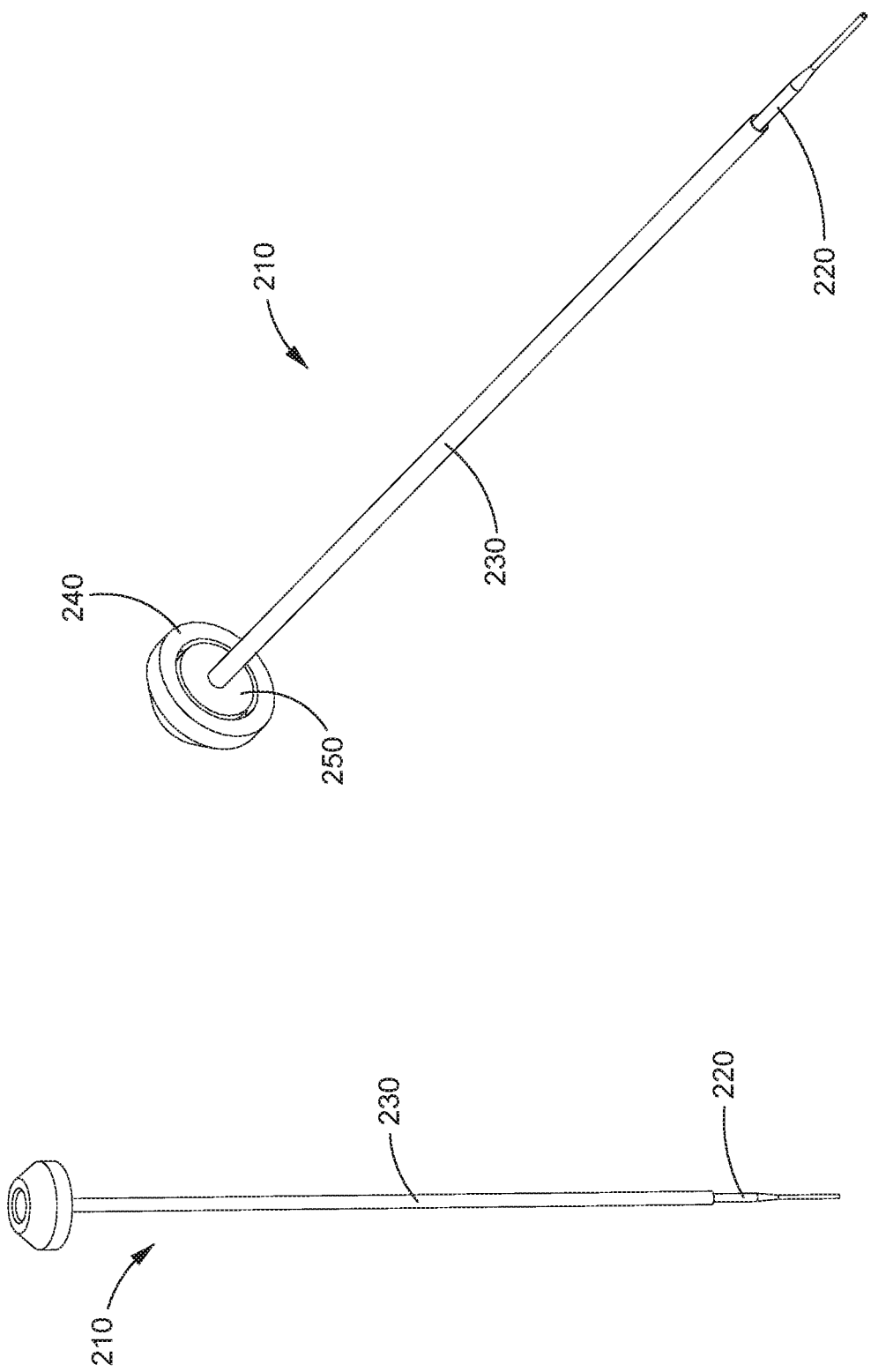

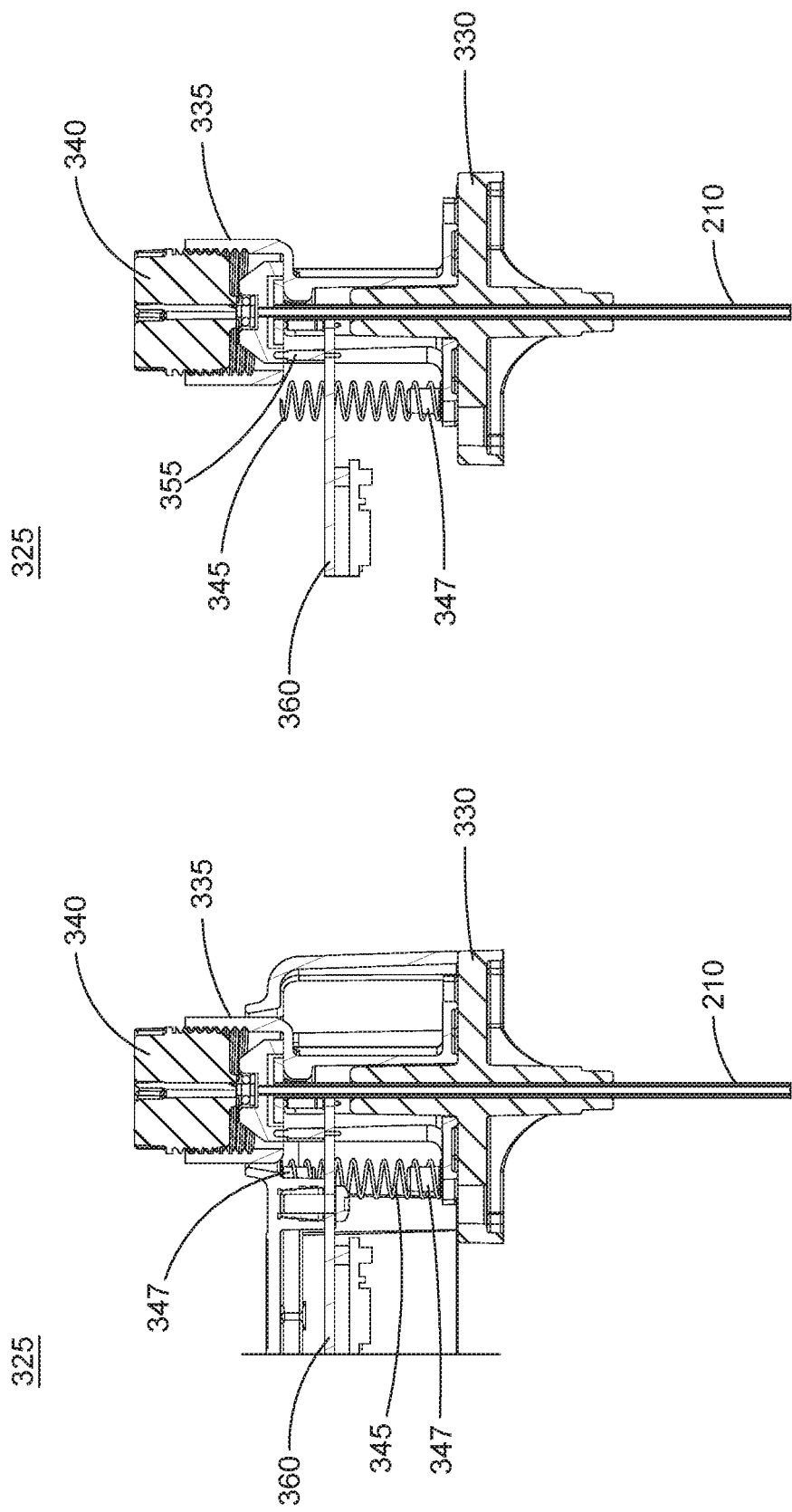

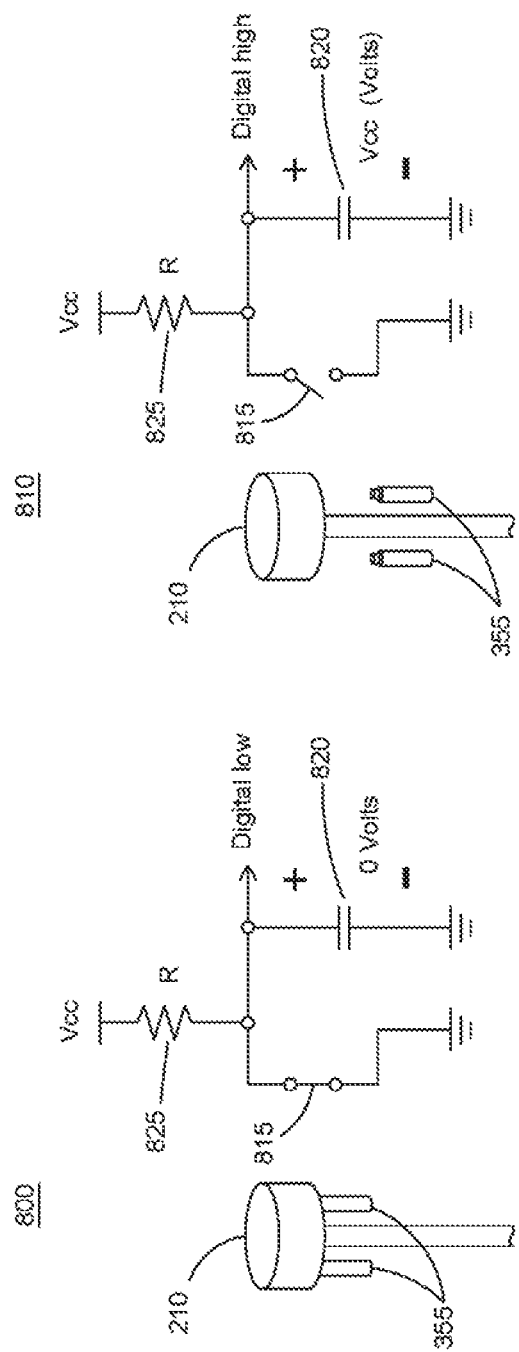

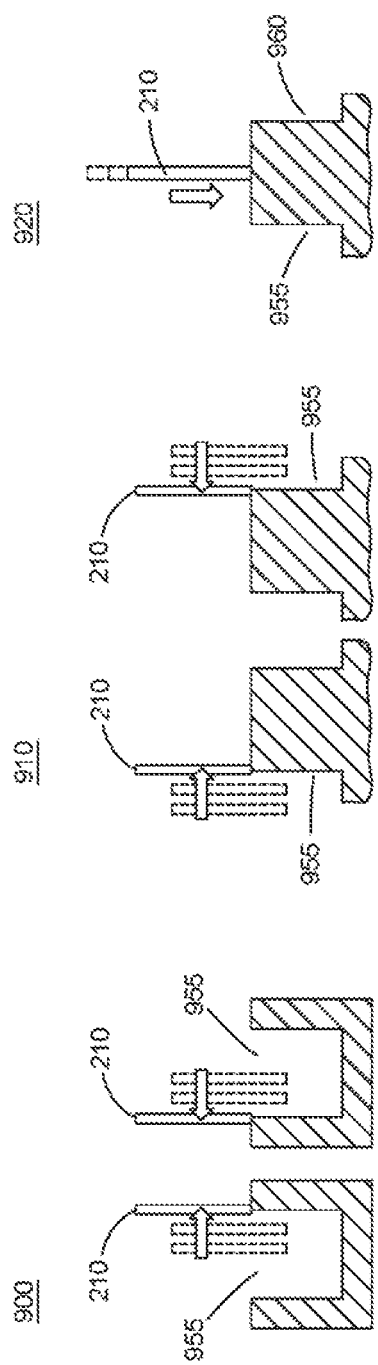

CLINICAL ANALYZER PROBE CRASH DETECTION MECHANISM AND PROCESS

CROSS-REFERENCE TO RELATED APPLICATIONS

This application claims priority to U.S. provisional application Ser. No. 62/335,349, filed May 12, 2016 and entitled "Clinical Analyzer Probe Crash Detection Mechanism and Process," the contents of which are incorporated herein by reference in their entirety. This application is related to U.S. provisional application Ser. No. 62/297,264, filed Feb. 19, 2016 and entitled "Single-Piece Transfer Arm Structure for Analytical Instrumentation," and to U.S. provisional application Ser. No. 62/334,776, filed May 11, 2016 and entitled "Quick Connection for Liquid Level Sense Enabled Metering Probe," both of which are incorporated herein by reference in their entirety.

TECHNOLOGY FIELD

The present invention relates generally to a transfer arm in an in vitro diagnostics environment, and more particularly to a self-resetting probe crash detection and an automated inspection mechanism for a probe attached to a transfer arm.

BACKGROUND

Clinical analyzers typically require a transfer arm to position a fluid transfer probe (or needle) and move the probe between various locations to aspirate a fluid and to dispense a fluid; for example, between a reagent container and a reaction vessel. Multiple transfer arms are typically used to handle such transfers for an analysis of a sample. A transfer arm may encounter an obstruction between the probe and its destination (e.g., reagent container, reaction vessel) as the probe descends. For example, a cap that was not properly removed from a sample container or a reagent container may block or inhibit the path of the probe. Misalignment, dislodged covers, service tools, foreign objects, and the like may also obstruct the path of the probe.

As modern clinical analyzers handle multitudes of samples and have high throughput, the transfer arm motions occur at high speeds. Fluid metering performance requirements often dictate the need for slender probes that are prone to bending and deformation on contact.

Most modern clinical analyzers require user inspection and response to determine if a "crash" (i.e., a collision between a probe and an obstruction) has occurred. With this user-intensive approach, many patient analyses can be compromised in the time between the crash and its detection by a user. In some analyzers, feedback may be obtained from a position error on a vertical drive of the probe. However, due to the velocities and forces involved in the movement of the probe, the probe may be bent while the vertical drive successfully completes its motion, resulting in no detection of the collision. Other designs may include sensors and mechanisms that cause the probe to be dislodged during a collision. While capable of detecting a collision, this approach requires user invention to inspect and reset the probe. Moreover, due to the limited space available for the dislodging action, the probe is often bent during the dislodging action.

Thus, there is a need to have feedback that a probe contacted an obstruction, both to know that the current fluid transfer was not successful and to know that the probe itself may be damaged. Moreover, the ability to obtain such feedback without user intervention is desirable.

SUMMARY

Embodiments are directed to a self-resetting probe crash detection and an automated inspection mechanism for a probe involved in a collision, in, for example, a clinical analyzer in an in vitro diagnostics environment.

In one embodiment, a crash detection mechanism for use on a transfer arm in a clinical analyzer in an in vitro diagnostics (IVD) environment comprises: a crash detection printed circuit assembly (PCA) comprising a switch; a probe comprising a probe head; and a spring-loaded contact sensor assembly configured to secure the probe within the transfer arm and allow for an electrical connection between the switch and the probe during normal operation and an electrical disconnection upon contact of the probe with an obstruction. The PCA is configured to send a signal to a drive mechanism upon the electrical disconnection between the probe and the switch; and the drive mechanism operates to stop movement of the transfer arm upon receipt of the signal from the PCA.

According to an embodiment, the spring-loaded contact sensor assembly comprises: a probe holder configured to clamp to a top portion of the probe and move vertically with the probe; a fitting configured to thread into the probe holder to clamp the probe into the probe holder; one or more compression springs located between the probe holder and an underside portion of the transfer arm; and a probe guide comprising a vertically-oriented bore through which the probe passes, wherein a surface of the probe guide perpendicular to the bore mounts to an underside portion of the transfer arm. The probe holder is configured to travel vertically above the probe guide as the probe slides vertically through the probe guide; and the probe holder is forced downward against the probe guide by the one or more compression springs.

In an embodiment, end portions of the one or more compression springs are located by corresponding spring posts protruding from the probe holder and the underside portion of the transfer arm.

In an additional embodiment, the crash detection mechanism further comprises one or more pairs of magnets to further secure the probe holder and the probe guide to one another.

In an embodiment, the switch comprises at least one spring-loaded pin. According to an embodiment, during normal operation the probe head compresses the at least one spring-loaded pin downward with force from the one or more compression springs and the underside portion of the transfer arm. In an embodiment, the at least one spring-loaded pin are lifted off of the probe by compression of the one or more compression springs if a vertical motion of the probe is halted, thereby breaking the electrical contact between the probe and at least one spring-loaded pin.

In an alternative embodiment, the switch comprises an optical sensor.

In an alternative embodiment, the switch comprises a Hall effect sensor.

In yet another embodiment, the probe head comprises a set of electrically isolated surfaces, and the probe further comprises a primary tube nested within a secondary tube, the primary tube comprising a fluid passageway extending a length of the primary tube to contain fluid therein, wherein the primary tube and the secondary tube comprise respective heads at respective top portions thereof forming the set of electrically isolated surfaces.

In an embodiment, the transfer arm comprises a horizontally-extending chassis and a shaft oriented substantially perpendicular to the chassis, the chassis and the shaft coupled to one another by a coupler at a rear portion of the transfer arm. The drive mechanism is coupled to the shaft; and the PCA is mounted within an underside portion of the chassis.

According to an embodiment, a system for detecting a collision in a clinical analyzer in an in vitro diagnostics (IVD) environment comprises: a transfer arm comprising a horizontally-extending chassis and a shaft oriented substantially perpendicular to the chassis, the chassis and the shaft coupled to one another by a coupler at a rear portion of the transfer arm; a drive mechanism coupled to the shaft, the drive mechanism configured to control movement of the transfer arm; and a crash detection mechanism housed within an underside portion of the chassis at a forward portion of the transfer arm. The crash detection mechanism comprises a crash detection printed circuit assembly (PCA) comprising a switch; a probe comprising a probe head with a set of electrically isolated surfaces; a spring-loaded contact sensor assembly configured to secure the probe within the transfer arm and allow for an electrical connection between the switch and the probe during normal operation and an electrical disconnection upon contact of the probe with an obstruction. The PCA is configured to send a signal to the drive mechanism upon the electrical disconnection between the probe and the switch; and the drive mechanism operates to stop movement of the transfer arm upon receipt of the signal from the PCA.

In an embodiment, a method of detecting and responding to a collision in an in vitro diagnostics (IVD) environment comprises: detecting the collision between a probe comprising a probe head with a set of electrically isolated surfaces and an obstruction, the detecting performed by a crash detection mechanism comprising: a crash detection printed circuit assembly (PCA) comprising a switch; and a spring-loaded contact sensor assembly configured to secure the probe within a transfer arm and allow for an electrical connection between the switch and the probe during normal operation and an electrical disconnection upon contact of the probe with an obstruction; and generating and transmitting, by the crash detection mechanism, an output signal to a drive mechanism configured to control movement of the transfer arm.

In an embodiment, the method further comprises resetting the crash detection mechanism to reestablish connection between the at least one spring-loaded pin and the probe.

In an embodiment, the method further comprises implementing an automated inspection method comprising: moving, by the drive mechanism, the transfer arm to an alignment verification hole on an alignment block; lowering, by the drive mechanism, the transfer arm to the alignment verification hole; and one of (i) implementing an automated alignment method upon detection, by the crash detection mechanism, of a secondary collision between the probe and a portion of the alignment verification hole or (ii) utilizing a larger verification hole, sized larger in diameter than the alignment verification hole, to verify the probe is not damaged if there is no secondary collision. In an embodiment, the automated alignment method comprises: aligning, by the crash detection mechanism, the probe to one or more targets to determine an offset required to allow the probe to enter the one or more targets; and applying the offset to aligned locations during normal operation. In an additional embodiment, the automated alignment method further comprises: after the aligning step, moving, by the drive mechanism, the transfer arm to the alignment verification hole on the alignment block to detect a conclusory collision; lowering, by the drive mechanism, the transfer arm to the alignment verification hole; and one of (i) utilizing the larger verification hole to verify the probe is not damaged if there is no conclusory collision or (ii) sending an error signal and stopping operation upon the detection, by the crash detection mechanism, of the conclusory collision between the probe and the alignment verification hole.

According to an embodiment, the method further comprises, after utilizing the larger verification hole, one of (i) resuming operation if there is no collision with the larger verification hole or (ii) ending operation if there is a collision with the larger verification hole.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIGS. 2A-2D are diagrams illustrating features of a probe for use with embodiments described herein;

FIGS. 7A-7D are diagrams illustrating details of a crash detection mechanism assembly, according to an embodiment;

FIGS. 8A and 8B are diagrams depicting a crash detection circuit, according to an embodiment;

FIGS. 9A-9C are diagrams illustrating use of an alignment block for inspecting a probe after a collision and to correct for minor damage to the probe, according to various embodiments;

DETAILED DESCRIPTION

Embodiments are directed to a transfer arm with a probe and a crash detection mechanism for use in a clinical analyzer in an in vitro diagnostics (IVD) environment in a hospital or laboratory setting. As clinical analyzers typically require a transfer arm to position a fluid transfer probe (or needle) and move the probe between various locations to aspirate a fluid and to dispense a fluid, there is a need to detect if the probe is involved in a collision with an obstruction and to determine if the probe is damaged. According to embodiments herein, a self-resetting probe crash detection and an automated inspection mechanism for a probe involved in a collision are provided.

Advantageously, the mechanism, according to embodiments described herein, requires no user-intervention after a collision event, unless the automated inspection mechanism determines that the damage to the probe requires probe replacement. Moreover, the mechanism, according to embodiments herein, is capable of protecting the probe, in some instances, from damage during a collision. Additionally, the mechanism provides for automatic resetting after a collision, self-checking, and alignment correction.

Figure 1:
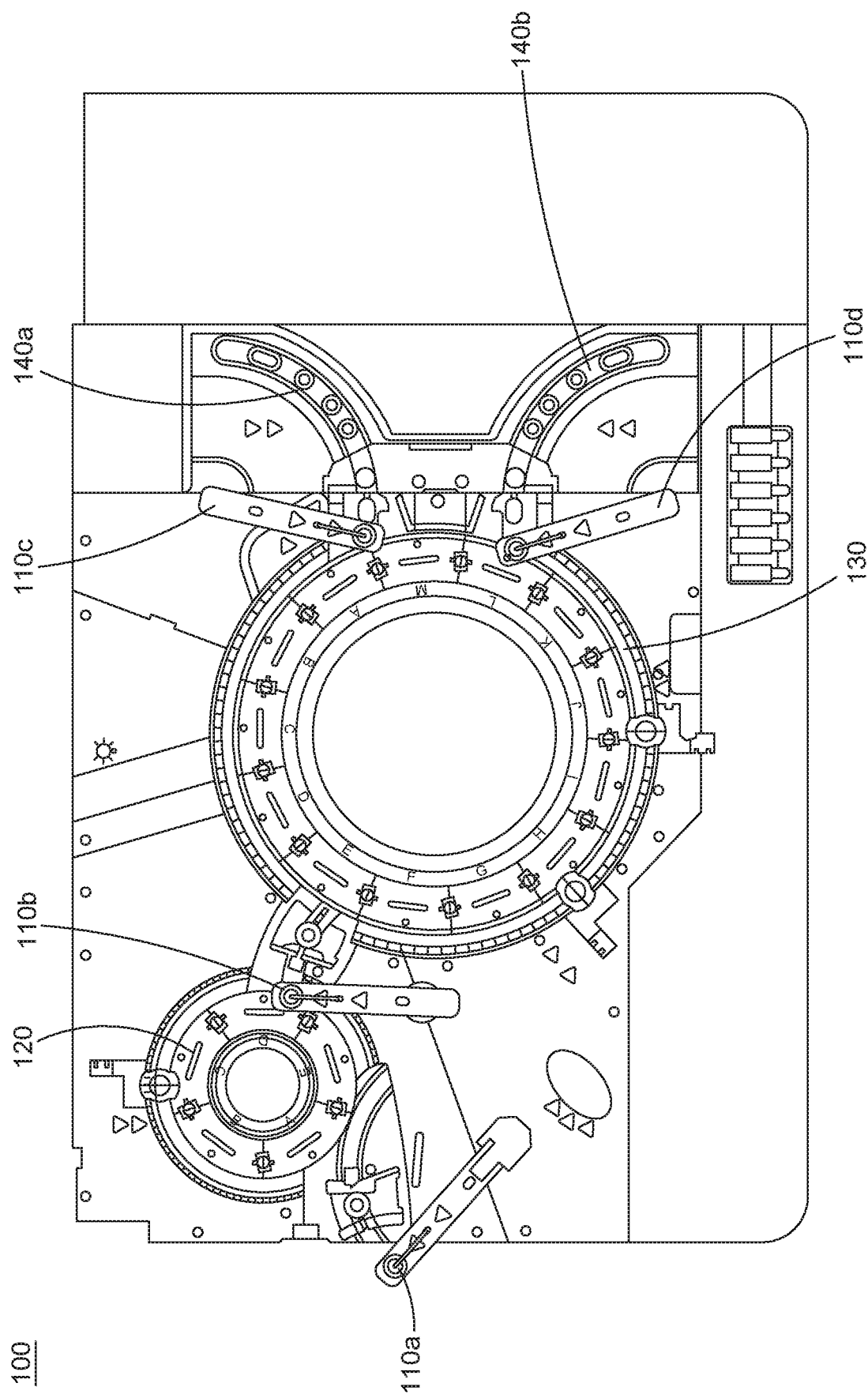
FIG. 1 is a layout of an example system architecture within which embodiments of the invention may be implemented, according to an embodiment.

FIG. 1 provides a layout of an example system architecture 100 within which embodiments of the invention may be implemented, according to an embodiment. Shown in FIG. 1 are various transfer arms 110 (110a, 110b, 110c, and 110d) with respective probes (see FIGS. 2A-2D and the associated description below for details relating to the probe); a diluting turntable 120 including a plurality of diluting containers arranged in one or more diluting rings; a reaction turntable 130 including a plurality of reaction containers arranged in one or more reaction rings; and reagent storage areas 140a and 140b dedicated to storage and supply of a respective reagent, each reagent storage area 140a and 140b including a plurality of reagent containers. In operation, transfer arm 110a and its respective probe may operate to transfer samples from an access position to one or more diluting containers on the diluting turntable 120 to create a dilution therein. Transfer arm 110b and its respective probe may operate to transfer dilutions from a diluting container to a reaction container on the reaction turntable 130. Transfer arms 110c and 110d and their respective probes may operate to transfer a reagent from reagent storage area 140a and 140b, respectively, to a reaction container on the reaction turntable 130. The various transfers occur by use of a pumping mechanism (not shown), such as a displacement pump, for example, attached to the transfer arms 110. Additionally, the system architecture 100 includes one or more controllers (not shown) for controlling operation of the various components, including the transfer arms 110, the probes, and the turntables.

The system architecture 100 of FIG. 1 and the accompanying description are purely exemplary and non-limiting to the self-resetting probe crash detection and automated inspection mechanism disclosed herein. The system architecture 100 is just one example system in which the self-resetting probe crash detection and automated inspection mechanism may be implemented.

Figure 2D:
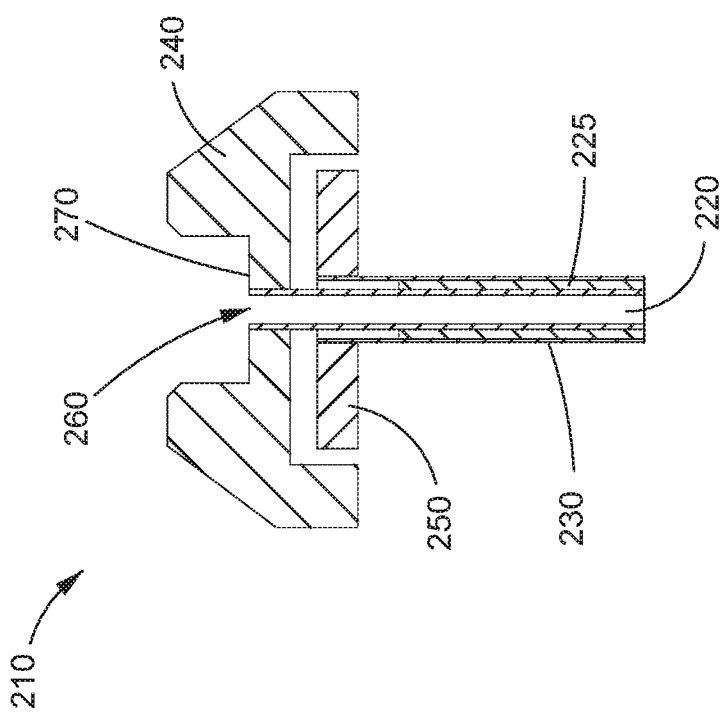
Figure 2C:
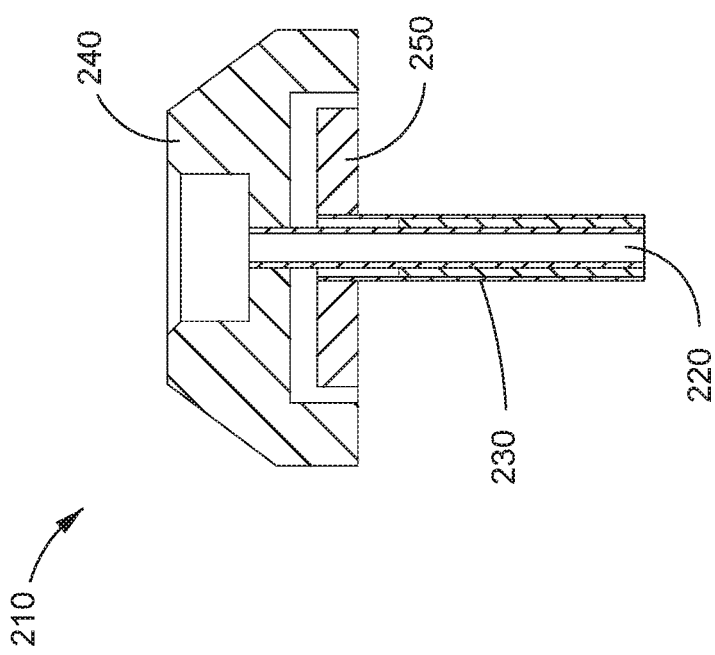

FIGS. 2A-2D are diagrams illustrating features of an exemplary probe 210 for use with embodiments described herein. FIG. 2A is a front view of the probe 210, 2B a perspective view, and 2C and 2D cross-sectional front views. The key function of the probe 210 is to reliably and precisely deliver or remove a specified amount of fluid to or from a vessel (e.g., a diluting container, a reaction container). The probe 210 interfaces securely with fluid tubing (see FIGS. 3-6) and incorporates internal features that support a reliable fluid transfer. The geometry of the interior of the probe 210 is such that repeatable fluid flow is possible, while the surface finish of the probe 210 is fine enough to avoid interference with smooth fluid flow and to resist carryover between fluid transfers.

With reference to FIGS. 2A-2D, features of the probe 210 are illustrated. The probe 210 is comprised of a primary tube (or inner probe) 220 partially nested within a secondary tube (or outer probe or ground shield) 230. The primary tube 220 is, according to an embodiment, made of stainless steel tubing, although other materials may be used. The primary tube 220 contains the aspirated and working fluids in fluid passageway 260. The tip of the primary tube 220 is used to sense the fluid surface as the probe 210 is descended into a container. Near the tip of the primary tube 220, an angled-taper is formed to optimize fluid flow and aid in transfer precision. In an embodiment, the angled-taper may be a 4° angle, which has been found to minimize flow losses and thus minimize turbulence. Other angles may of course also be used, dependent on, for example, the application and desired fluid flow properties. In other embodiments, the angled-taper design may not be necessary. The interior surface of the primary tube 220 may be finely polished to minimize carryover and ensure smooth fluid flow. A uniform, squared-off tip geometry of the primary tube 220 of the probe 210 is also important, in some applications, to reduce carryover. The inner diameter of the primary tube 220 may be adjusted depending on the application for which the probe 210 is being utilized.

The secondary tube 230 may, according to an embodiment, be made of stainless steel tubing, although other materials may be used. The secondary tube 230 extends around a majority (i.e., greater than 50%) portion of the primary tube 220 (i.e., most, but not all, of the way from the top to the tip of the primary tube 220). Its function is to provide a grounded shield around the primary tube 220 of the probe 210.

Each tube 220, 230 has a cylindrical cap or head attached (e.g., welded) at the top (primary tube contact ring 240 and secondary tube contact ring 250, respectively). The primary tube 220 and the secondary tube 230 are electrically isolated (via electrically isolating gap 225) yet securely attached to one another. This may be achieved through a layer of non-conductive material (e.g., heat shrink and epoxy) that fits securely between the tubes 220, 230 in the gap 225. The nesting orientation (within but without touching) allows each ring 240, 250 to reach the same horizontal level and provides for the rings 240, 250 to comprise a set of electrically isolated coplanar rings on the underside of the probe head. These rings 240, 250 create the surface to which electrical contact is made for the self-resetting probe crash detection and automated inspection mechanism described herein. The inner ring 250 provides the grounded connection to the outer, secondary tube 230 (i.e., the shield). In another embodiment, the cap or head attached to each tube 220, 230 is not cylindrical in shape but can be of another shape (such as, for example but not limited to, square), providing an electrically isolated surface for the contact for the self-resetting probe crash detection and automated inspection mechanism described herein.

The lower joint between the primary tube 220 and the secondary tube 230 (at the end of the secondary tube 230) is, according to an embodiment, filled and potted with epoxy to provide a physical linear separation between the two tubes 220, 230. This prevents fluid droplets from filling the gap 225 between the tubes 220, 230 and shorting out the probe 210. In another embodiment, a physical separation between the primary tube 220 and the secondary tube 230 is achieved by extending heat shrink material residing between the tubes 220, 230 beyond the outer probe (i.e., the secondary tube 230). In yet another embodiment, the physical separation between the tubes 220, 230 is achieved by adding a plastic ferrule or the like to fill the gap 225 and extend downward to separate the two tubes 220, 230 and prevent fluid from bridging the gap 225.

According to embodiments, a self-resetting probe crash detection and an automated inspection mechanism (also referred to herein as "a crash detection mechanism") is applicable to the transfer arms 110 and respective probes 210 that perform the types of transfers described above, in order to detect occurrence of collision and to protect the probe in an analyzer in an IVD environment, for example. However, other types of transfer arms and probes may also be utilized. For example, the mechanism can be installed on a transfer arm that travels in a linear fashion along, for example, a gantry. In an embodiment, a probe utilized with the crash detection mechanism described herein does not have a structure in which electrically isolated surfaces are formed.

Figure 3:
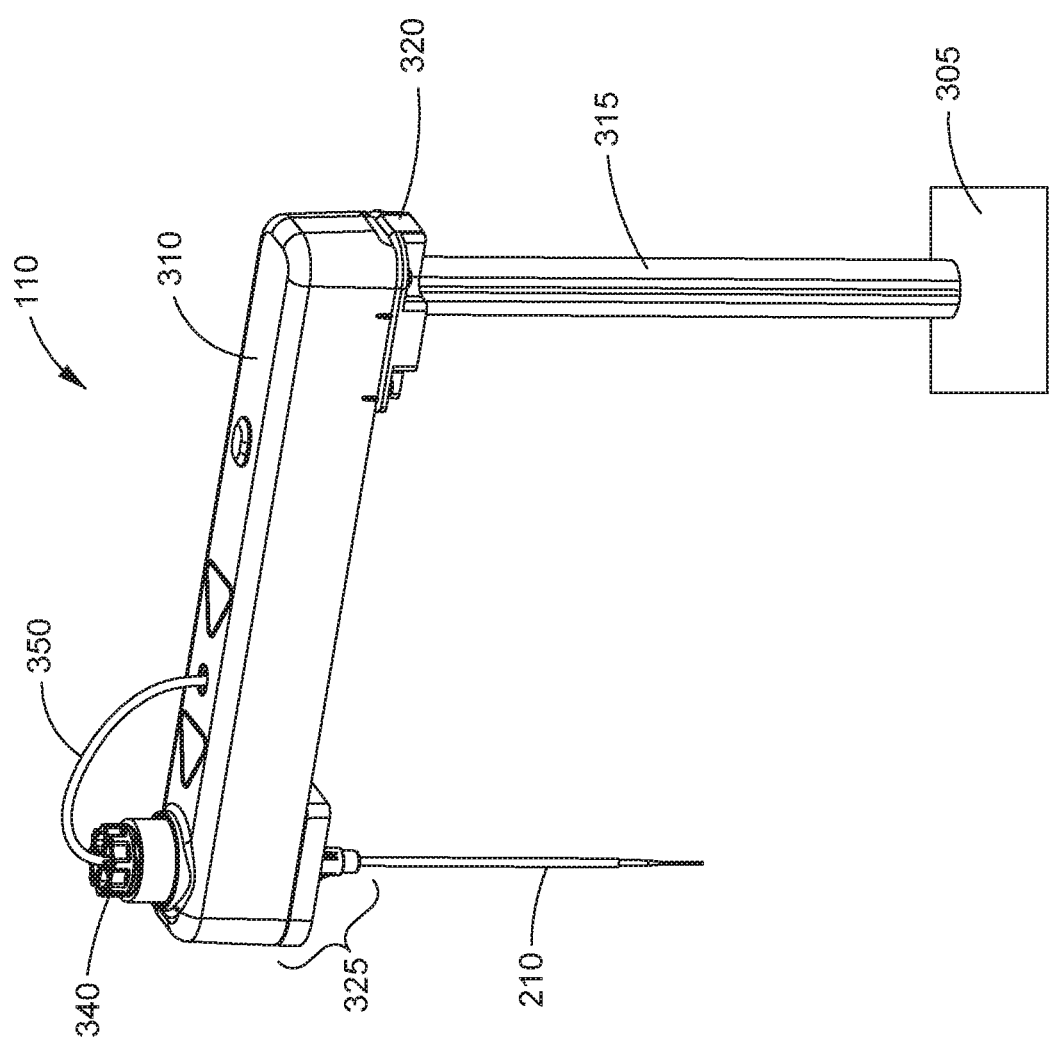
FIG. 3 is a diagram illustrating a top perspective view of a transfer arm with a probe and crash detection mechanism, according to an embodiment.
Figure 4:
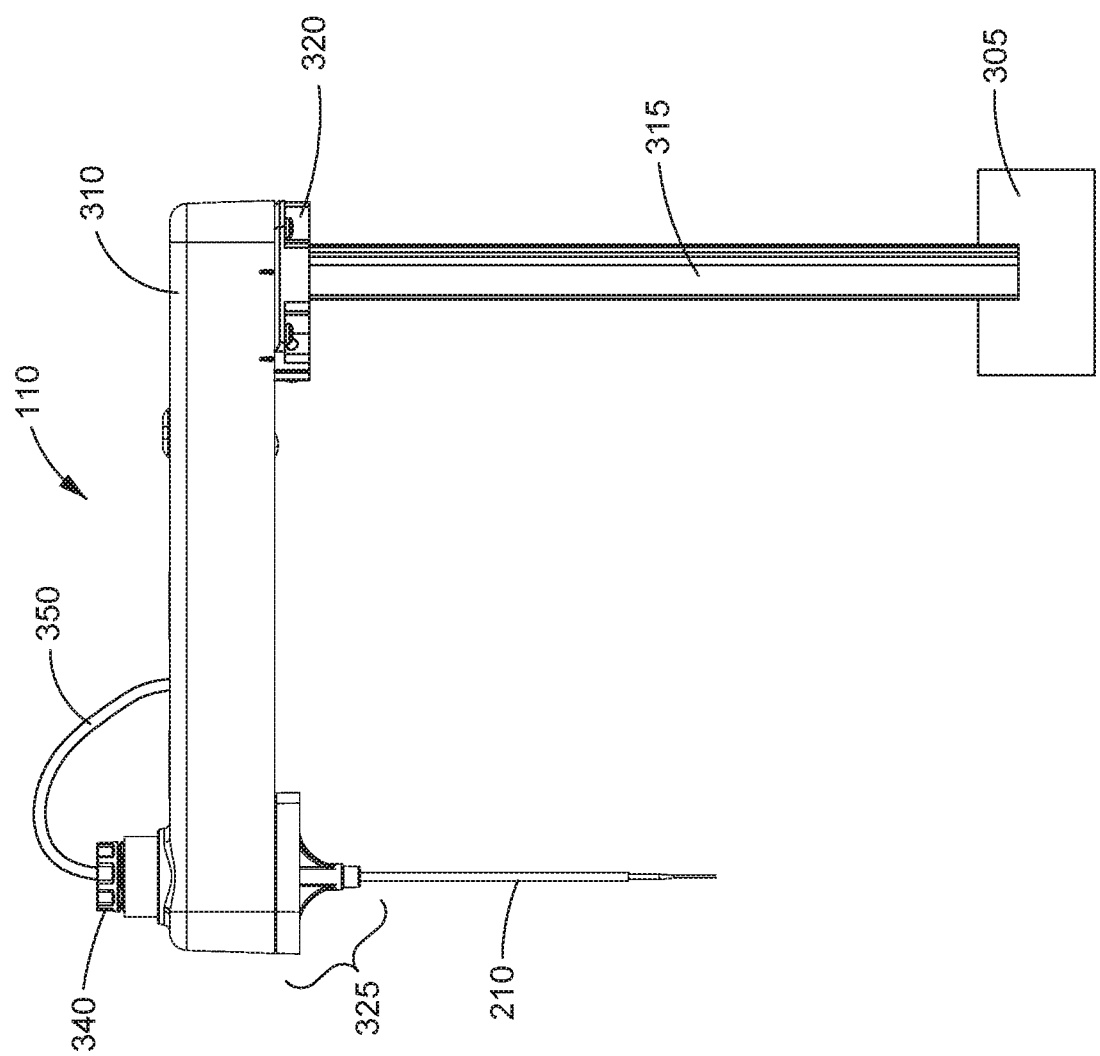
FIG. 4 is a diagram illustrating a side view of a transfer arm with a probe and crash detection mechanism, according to an embodiment.
Figure 5:
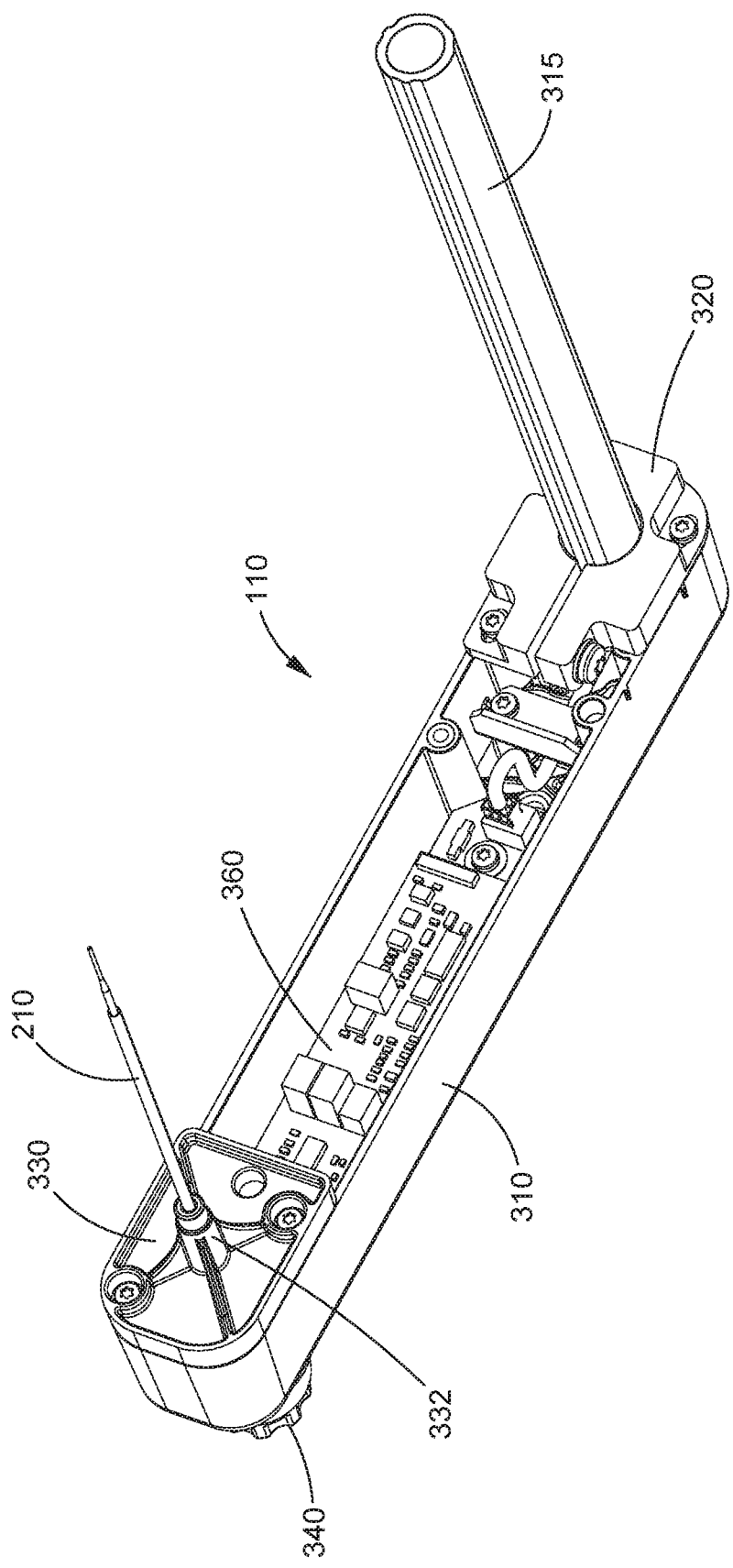
FIG. 5 is a diagram illustrating a bottom perspective view of a transfer arm with a probe and crash detection mechanism, according to an embodiment.

FIGS. 3-6 provide views of a transfer arm with a probe and crash detection mechanism, according to embodiments herein. FIG. 3 is a top perspective view of the transfer arm with the probe and crash detection mechanism, FIG. 4 a side view, FIG. 5 a bottom perspective view, and FIG. 6 an exploded, top perspective view.

The transfer arm 110 is comprised of a chassis 310 and a shaft 315, coupled to one another by a coupler, or clamp, 320. A drive mechanism 305 is coupled to the shaft 315 to drive rotational and vertical movement of the transfer arm 110. The chassis 310 may be a single piece of injection-molded plastic. The chassis 310 acts as both a mounting base and a cover for the transfer arm components.

Crash detection mechanism 325 may be housed in a forward portion of the transfer arm 110, away from the shaft 315, the coupler 320, and the axis of rotation of the transfer arm 110. In an embodiment, the crash detection mechanism 325 is partially housed within a portion of the transfer arm 110. The crash detection mechanism 325 is, according to an embodiment, comprised of a probe 210, a probe guide 330, a probe holder 335, a fitting 340, compression springs 345, spring posts 347, tubing 350, and a crash detection printed circuit assembly (PCA) 360 (see FIGS. 6 and 7A-7D). In an embodiment, the crash detection mechanism 325 includes one or more components that act as a switch, such as pins 355 shown in the embodiment of FIGS. 7A-7D. In an alternative embodiment, shown in FIGS. 12-14, a sensor 1201, such as an optical sensor, can be a component of the crash detection mechanism 325 for performing the function of a switch. Both embodiments are described in detail below.

In an embodiment, one or more pairs of magnets 365 may also be included as part of the crash detection mechanism 325, as described in detail below. In an embodiment, a spring-loaded contact sensor assembly is comprised of the probe guide 330, the probe holder 335, the fitting 340, the compression springs 345, and the spring posts 347. In an embodiment, the crash detection mechanism 325 is comprised of a probe 210, the spring-loaded contact sensor assembly, and the crash detection PCA 360.

The outputs of the crash detection PCA 360 are connected to a sensor input on the drive mechanism 305 that is responsible for driving the transfer arm's vertical motor which moves the probe 210 towards the sample. The sensor output activates if a vertical crash occurs.

The probe guide 330 is a stationary component relative to the chassis 310. It contains a long vertical bore 332 through which the probe 210 passes. The bore 332 is sized to provide minimal clearance for the probe 210 while still maintaining free vertical motion. The length of the bore 332 is sized to be of sufficient length to prevent binding as the probe 210 slides vertically. The probe guide 330 is, in an embodiment, made of a material with a low coefficient of friction to provide anti-binding properties and free vertical motion. A surface of the probe guide 330 perpendicular to the bore 332 mounts to an underside portion of the chassis 310.

The probe 210 is placed into the probe holder 335 through a top portion thereof, and may be hand-tightened to seal the tubing 350 against a top orifice of the probe 210 (see FIG. 2D, fluid tubing sealing surface 270) while also securing the probe 210 in place.

The probe holder 335 clamps to the top of the probe 210, and is allowed to travel vertically above the probe guide 330 as the probe 210 slides vertically through the probe guide 330. In an embodiment, a threaded fitting 340 (e.g., M20 thread size) threads into an internal threaded portion of the probe holder 335 to serve as a probe locking device and both clamps down the probe 210 into the probe holder 335 and also provides for a secure fluid connection between the tubing 350 and the probe 210. In this configuration, removal or installation of the probe 210 is simple and requires no tools, as the fitting 340 can be removed and installed by hand. Once the fitting 340 is unthreaded, the probe 210 can be easily slid up through the probe guide 330 for removal. The probe holder 335 has a gap under the head of the probe 210 to allow for electrical contacts to engage the underside of the probe 210. Thus, in one connection via the fitting 340, mechanical (via the threaded fitting 340) and fluid (via the tubing 350) connections are made to the probe 210. In the embodiment shown in FIGS. 7A-7D in which spring-loaded pins 355 are incorporated, the fitting 340 also makes an electrical connection (via the spring-loaded pins 355) to the probe 210. The probe holder 335 may also have a tab on the bottom to prevent incorrect assembly.

Figure 6:
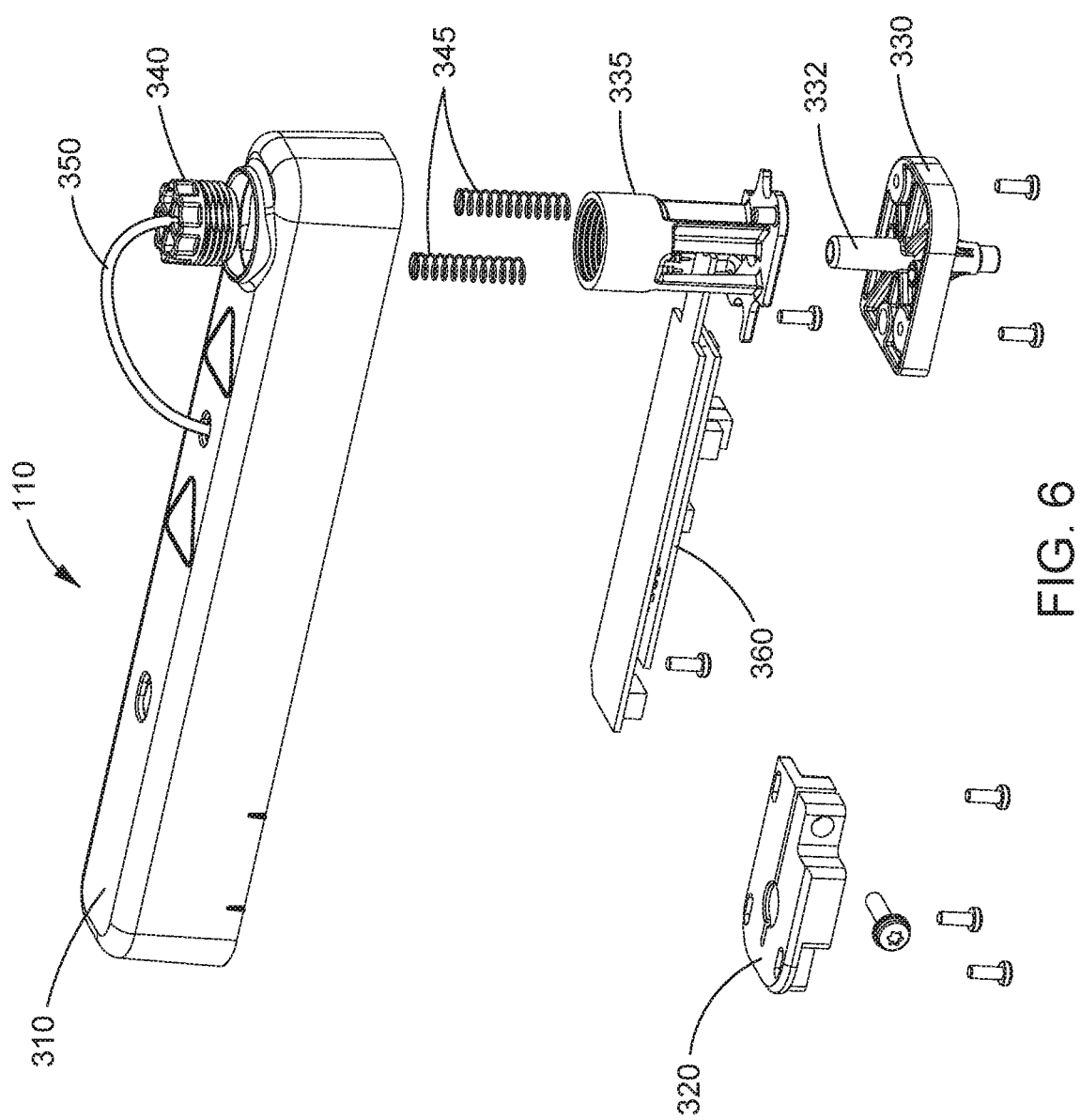
FIG. 6 is a diagram illustrating an exploded, top perspective view of a transfer arm with a probe and crash detection mechanism, according to an embodiment.
Figure 7D:
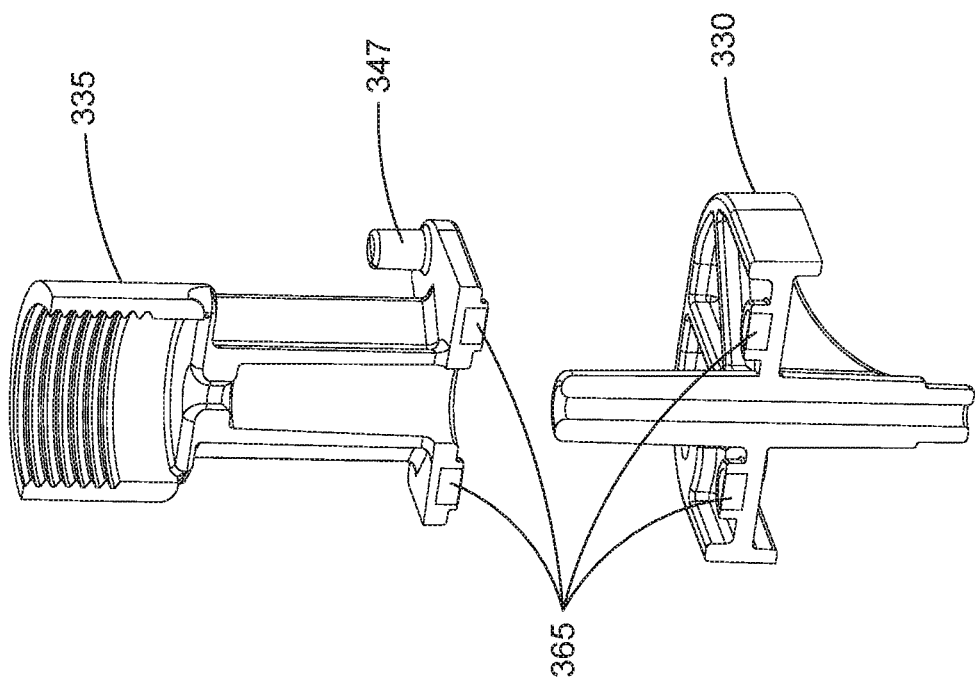
Figure 7C:
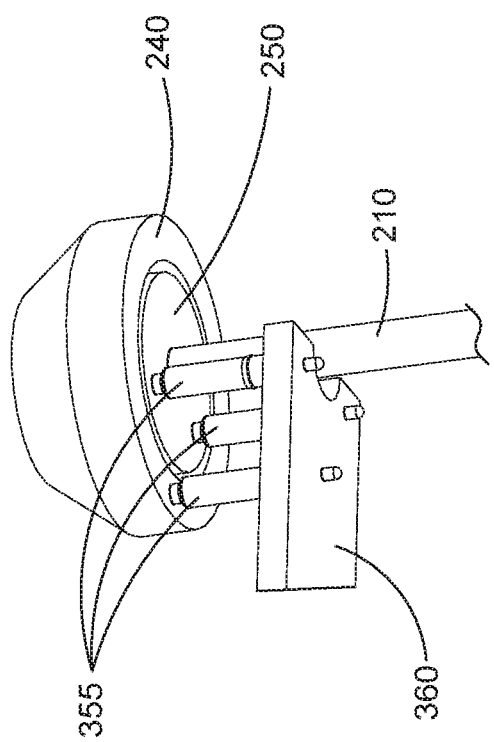

In an embodiment, the tubing 350 that passes through the center bore of the fitting 340 is flared at the end. Behind this flare (between it and the fitting 340), an O-ring (not shown) may be sandwiched between a pair of washers (not shown). A protrusion on the end of the fitting 340 presses down on the washer, compressing the O-ring and pressing the tubing flare into a mating surface in a pocket on the top of the probe 210. The contact between the tubing flare and the probe 210 forms the fluid seal. The O-ring performs the function of energizing the joint, which allows for a wider range of tightness of the fitting 340 to properly seal the O-ring. In addition to pressurizing the seal between the tubing 350 and the probe 210, the fitting 340 also presses down the probe 210 into the probe holder 335 to clamp it into place. Once the probe 210 is fully seated in the probe holder 335, spring-loaded pins 355 make electrical contact with the probe 210 (described in greater detail below with respect to FIGS. 7A-7D). Also shown in FIG. 6 are various screws and connectors for securing the various components together and to the transfer arm 110, as described herein.

FIGS. 7A-7D are diagrams illustrating, in greater detail, the crash detection mechanism 325 with spring-loaded pins 355, according to an embodiment. When assembled into the chassis 310, the probe holder 335 is forced downward against the probe guide 330 by one or more compression springs 345 between the probe holder 335 and the chassis 310. The ends of springs 345 are located (i.e., positioned) by spring posts 347 protruding from both the probe holder 335 and the chassis 310. The springs 345 provide for a force to keep the probe holder 335 in place during normal operation, but allow for the probe holder 335 to move upward during the event of a probe crash. The spring force is selected to be small enough to minimize the chance of the probe 210 buckling during a collision, but strong enough to overcome friction and return the probe 210 to the nominal position after a collision event.

According to an embodiment, two or more spring-loaded "pogo-pin" electrical contacts 355 are mounted to the PCA 360, which is mounted within an underside portion of the chassis 310 of the transfer arm 110. In an embodiment, one of the pins 355 is used for electrical ground and one for the crash detection mechanism. In some embodiments, one or more additional pins may also be provided for other mechanisms (e.g., one for capacitive level sensing). The pins 355 extend from the PCA 360 through the clearance hole (i.e., gap) in the bottom of the probe holder 335, to contact the two rings 240, 250 on the underside of the head of the probe 210. In an embodiment, IDI C Series pins (CP-2.5-6-TH) are used for the spring-loaded pins 355. In an embodiment, the pins 355 are gold plated to ensure a good electrical connection. According to an embodiment, the pins 355 may be soldered to the PCA 360 using through-hole mounting to maximize the amount of mechanical stress the design can take. In an embodiment, the pins 355 have a working travel or compression specification of 2.0 mm maximum.

Stability of the connection between the PCA 360 and the probe 210 is critical to prevent false, spurious measurements, as any movement between the pin contacts 355 and the probe 210 can create a false measurement. Thus the crash detection mechanism 325 may, in an embodiment, utilize magnets 365 in addition to the springs 345 to firmly couple the moving (e.g., the probe 210 and the probe holder 335) and stationary (e.g., the probe guide 330) halves of the mechanism 325 to prevent such movement as would otherwise be caused by vibration and other motions of the transfer arm 110 (i.e., to lock the probe holder 335 in place during normal operation; see FIG. 7D). While the spring force increases proportionally with the distance, the probe holder 335 and the probe 210 move upwards and the magnetic force decreases by the square of that distance. Therefore, the magnetic force in this case only serves to keep the probe holder 335 stable in the normal position, but does little to interfere with the upward movement during a collision event. In addition to or alternative to the springs 345 and the magnets 365, a spring constant force, a shock absorber, or the like may be utilized.

During normal operation, the cap of the probe 210 (i.e., the rings 240, 250) compresses the spring-loaded pins 355 on the PCA 360 downward, with force supplied by the compression springs 345 captured between the probe holder 335 and the roof of the chassis 310 (as well as the magnets 365 which lock the probe holder 335 and the probe guide 330 together, in an embodiment).

However, if during a downward motion of the transfer arm 110, the probe 210 contacts an unexpected obstruction, the vertical motion of the probe 210 is halted while the transfer arm 110 continues its downward motion as the magnets 365 disengage and the springs 345 begin to compress. Thus, in the event of a crash, the probe 210 and the attached probe holder 335 and fitting 240 are permitted upward motion that is then resisted by the springs 345. When the probe 210 lifts off of the spring-loaded pins 355, an electrical circuit is broken and the PCA 360 reports a crash (via a signal (e.g., a 5V signal) sent to the drive mechanism 305). The drive mechanism 305 recognizes this signal as a collision and responds to quickly bring the motion to a halt. The motion can be stopped in various ways, including but not limited to rapid deceleration, instant deceleration/braking, or removal of power to the drive mechanism 305. Meanwhile, the moving parts come to a stop and will return to their nominal positions when the upward crashing force is removed. Due to the inertia of the transfer arm 110, some additional distance may be required for the transfer arm 110 to come to a complete stop. The available travel of the probe holder 335 as it compresses the springs 345 is sized to allow for this stopping distance. Therefore, the transfer arm 110 is provided distance to come to a halt without placing undue force on the probe 210. In this way, the probe 210 is protected from forces large enough to cause buckling or other damage.

That is, the spring-loaded mechanism takes a load off the probe 210 to not absorb the full impact (instead, it is absorbed by the springs 345). Upon detection of the collision, the motor driving the transfer arm 110 (i.e., the drive mechanism 305) comes to a stop. With this combination, in many cases, the probe 210 avoids being damaged.

Figure 12:
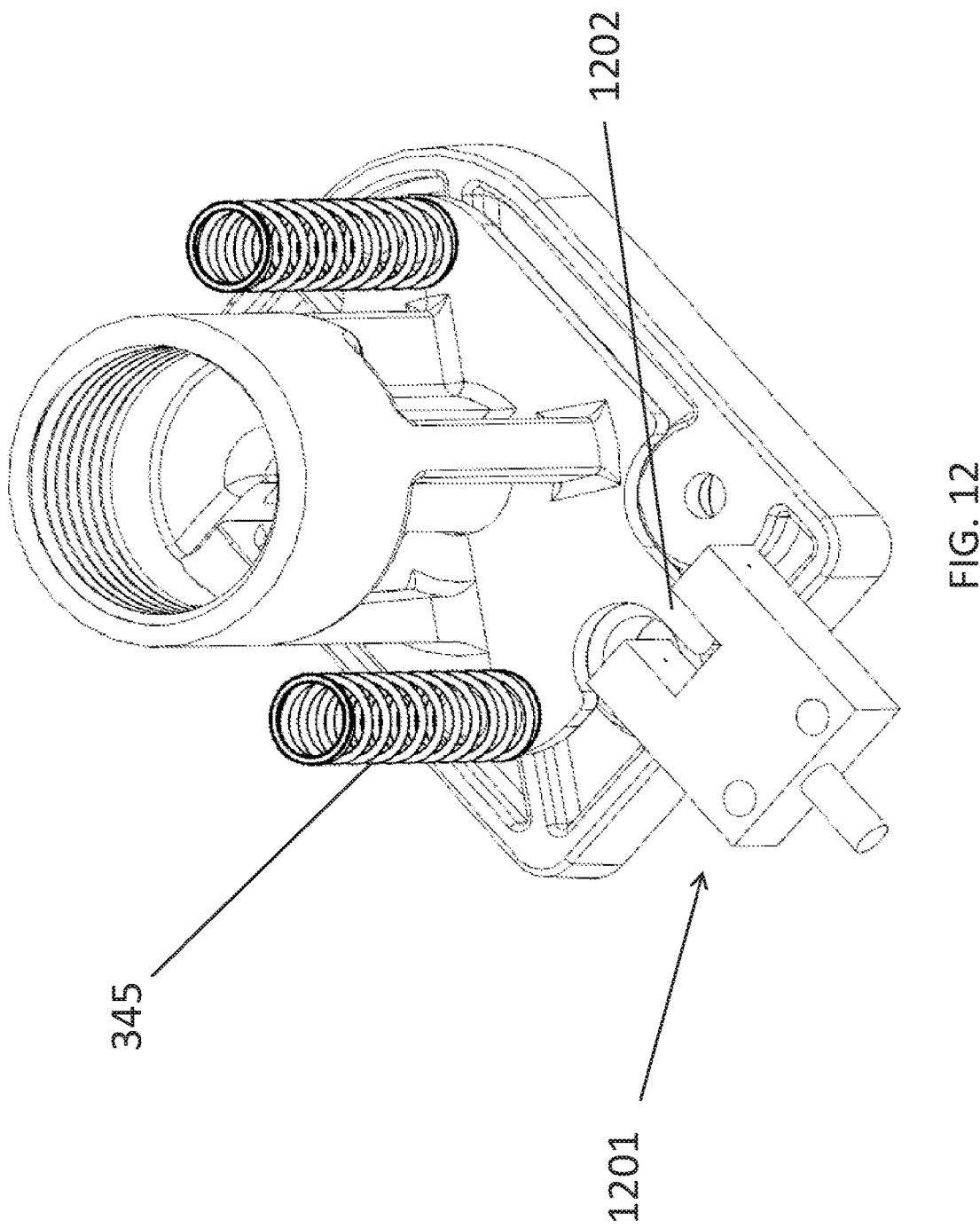
FIG. 12 is a diagram illustrating details of a crash detection mechanism assembly, according to an embodiment.
Figure 13:
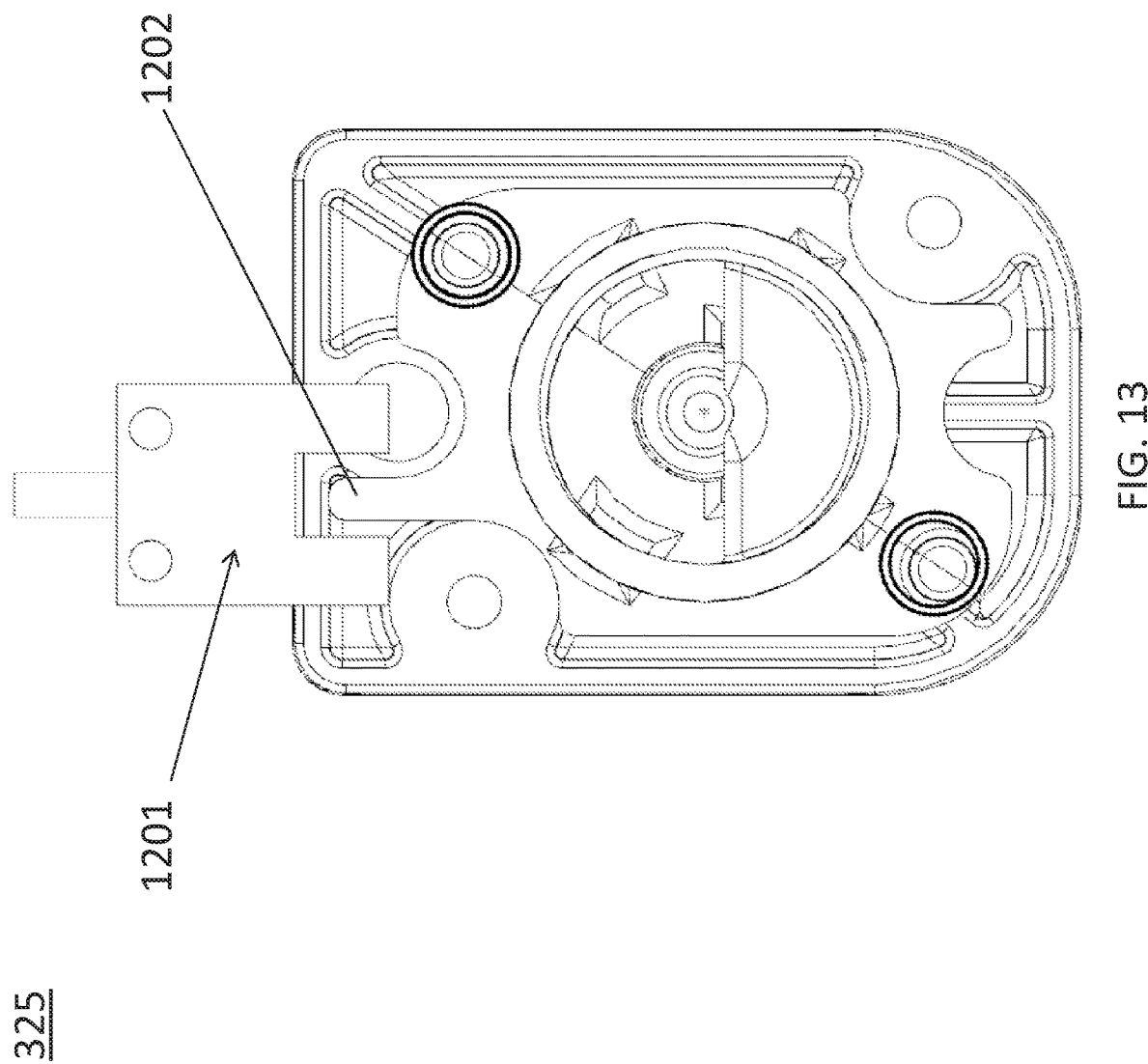
FIG. 13 is a diagram illustrating details of a crash detection mechanism assembly, according to an embodiment.
Figure 14:
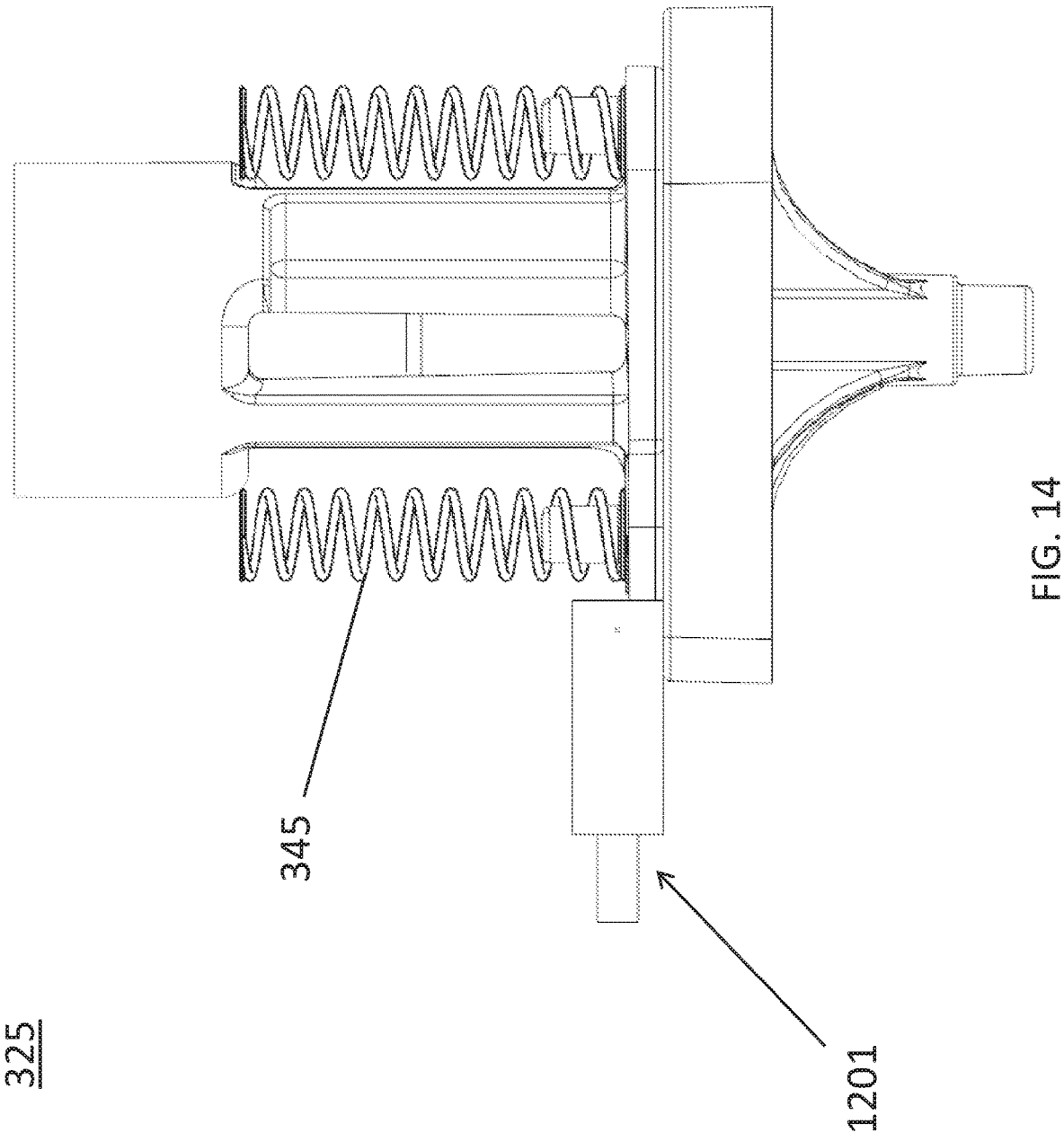
FIG. 14 is a diagram illustrating details of a crash detection mechanism assembly, according to an embodiment.

FIGS. 12-14 are diagrams illustrating, in greater detail, the crash detection mechanism 325 with sensor 1201, according to an alternative embodiment. In the alternate embodiment, the sensor 1201 does not need to be mounted to a PCA (as may be the case with the spring loaded pins). In this embodiment an optical sensor XXX replaces the spring loaded pins to sense when the probe has encountered an obstruction. During normal operation, a protrusion or flag 1202, from the probe holder intercepts the beam from the optical sensor. As the probe holder moves upward relative to the probe guide in the event of a crash, the flag 1202 moves out of the optical path of the sensor to initiate a change of state of the sensor electrical digital output to the drive mechanism, for example, changing the signal from zero to 5 volts. The drive mechanism can then respond as previously described in the spring-loaded pin embodiment. Alternatively, the normal state of the optical sensing mechanism could be with the flag 1202 outside of the optical path of the sensor 1201, with the path being interrupted when a crash occurs and the flag 1202 moves into the optical path of the sensor 1201.

In another embodiment, the sensor 1201 can be a Hall effect sensor in combination with a magnet. For example, the Hall effect sensor can be placed above one of the magnets 365 located in the probe holder 335. When the magnetic field strength at the sensor changes due to the relative motion of the magnet to the sensor, the output signal of the sensor to the drive mechanism 305 will change state, initiating the drive mechanism to respond to the crash.

FIGS. 8A and 8B are diagrams 800 ("no crash") and 810 ("crash") depicting a crash detection circuit, according to an embodiment. The crash and ground nodes 815, 820 are shorted together when the probe 210 is engaged to the PCA 360. When the probe/holder/fitting assembly (components 210, 335, and 340) moves vertically to unload the spring contact (about 2 mm travel), the electrical connection between the probe 210 and the contact pins 355 is broken, allowing a pull up resistor 825 to activate the crash line to 5V, and the printed circuit assembly 360 sends a digital signal to the drive mechanism 305. Thus, the contact between the pins 355 and the probe 210 acts as a sensor to detect a probe collision. Software in the drive mechanism 305 detects this signal and performs an appropriate set of actions to respond to the detected probe collision, as described above.

The spring-loaded pins 355 perform the function of the switch 815 shown in FIGS. 8A and 8B. Other mechanisms or components may alternatively be utilized to perform the function of the switch 815, such as, but not limited to, an optical sensor, a hall-effect sensor, or other types of spring-loaded switches. See, for example, the description of the sensor 1201 with respect to FIGS. 12-14.

Unfortunately, this protection by the crash detection mechanism 325 may not always be sufficient to prevent damage or bending to the probe 210. For example if the surface the probe 210 contacts is at a significant angle, or if the surface moves horizontally, the probe 210 can slide along the surface horizontally. If this movement causes the probe 210 to deflect enough to exceed its yield stress, the probe 210 will permanently bend. Thus, it is beneficial to be able to inspect a probe 210 after a collision, especially in an automated way.

FIGS. 9A-9C are diagrams 900, 910, and 920 illustrating use of an alignment block comprised of an alignment verification hole 955 and a parking port 960, for inspecting a probe 210 after a collision and to correct for minor bending to the probe 210, according to various embodiments.

To perform an automated inspection, according to embodiments herein, the alignment verification hole 955 is provided as a target along the range of travel of the probe 210. The alignment verification hole 955 is, according to an embodiment, provided on the exemplary system architecture 100 described above at a position accessible by the probe 210 via the transfer arm 110. The hole 955 is sized so that the tip of the probe 210 can enter the hole 955 with enough clearance to account for various tolerances. The probe 210 is aligned to be able to enter this hole 955 during initial set-up. After a collision event (or even during a periodic maintenance check), the probe 210 can be lowered into this hole 955. If the probe 210 enters the hole 955, no collision is detected. However, if the probe 210 is bent, it will fail to enter the hole 955, and the crash detection mechanism 325 described above will be activated. In an embodiment, capacitive level detection can be used to supplement this measurement to help detect extremely bent probes that no longer reach the surface. Thus, the system can automatically determine if the probe 210 was bent during a collision event. A user can then be notified of the event and that the probe 210 requires replacement. Otherwise, normal operation can continue without user intervention.

In another embodiment, it is also possible to correct for minor (e.g., on the order of a mm) bending of the probe 210 by finding the offset required to correct the probe position to be able to enter the hole 955, and apply this offset to all other aligned locations. This offset can be found through a normal automated alignment process, as described below.

FIG. 9A (900) illustrates the alignment method for aligning to inside targets, FIG. 9B (910) for aligning to outside targets, and FIG. 9C (920) for aligning to surface targets. The crash detection mechanism 325 may be used to assist with the automated alignment of the probe 210 to various targets. To find the edge of a target, such as a hole 955, a "hunt-and-peck" routine is used. In this process, the horizontal position of the probe 210 is set, and the probe 210 is moved downward a fixed distance. If not over the edge surface, the probe 210 moves down past the level of the edge, and no surface is detected. The probe 210 is then returned to the up position, the horizontal position incremented, and the probe 210 moved downwards again. When the probe 210 is over the edge surface, it will contact the surface during the downward motion. The crash detection mechanism 325 is then utilized as a surface detector. Once the location of the horizontal edges are known, the appropriate alignment locations can be calculated.

The vertical location of surfaces can also be detected in this manner. However, there is an offset from the actual surface location and the detected surface location due to the travel of the sensor contact. This can be calibrated using a nominal fixed offset. For more precise measurements, the travel can be measured if the probe 210 or target has a second sensing capability, such as capacitive liquid level sense. In this case, the exact level of a conductive surface can be measured capacitively, and then the probe 210 continues to be moved downward until the crash sensor activates. Then the exact value of the sensor travel is known, and this can be applied to other locations where capacitive sensing does not function, such as on non-conductive surfaces.

According to an embodiment, the parking port 960 can also be used after a collision event to determine the condition of the probe 210. The alignment verification hole 955 checks to see if the tip of the probe 210 is in the correct position, but due to its necessary small size, in some embodiments, the entire length of the probe 210 cannot enter the alignment verification hole 955. Since only the tip of the probe 210 enters the hole 955, if the probe 210 was significantly bent, for example bent 90 degrees halfway up the probe 210, then the probe 210 would not contact the alignment verification hole 955 (since it would never actually reach the hole 955) and appear to "pass" (i.e., a collision would not be detected). To verify that the probe 210 is not radically bent, the probe 210 is then descended for its entire length into the larger parking port 960. If the probe 210 is radically bent, then the probe 210 will crash at the point at which it is bent, and the probe 210 will not be able to enter the port 960. Accordingly, an error message may be sent by use of a controller associated with the system 100, for example.

Figure 10:
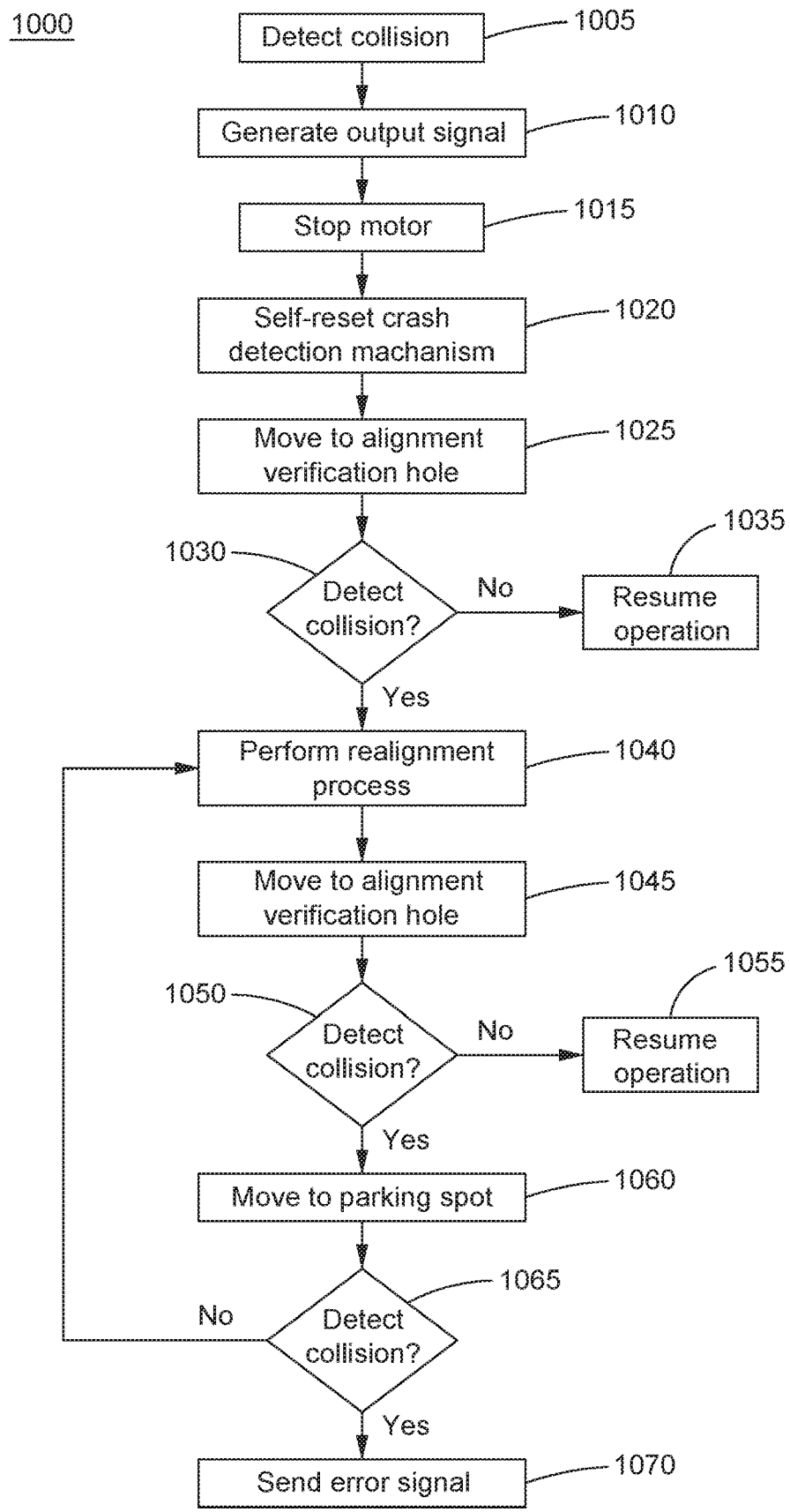
FIG. 10 is a flow diagram illustrating a method for detecting and responding to a collision, according to an embodiment.

FIG. 10 is a flow diagram 1000 illustrating a method for detecting and responding to a collision between a probe and an obstruction, according to an embodiment, in, for example, an IVD environment. The method utilizes various aspects of the crash detection mechanism 325 described herein. At 1005, a collision between a probe 210 and an obstruction is detected. The detection of the collision, utilizing the crash detection mechanism 325, results in a loss of the connection between the pins 355 of the crash detection PCA 360 and the electrically isolated rings 240, 250 of the probe 210. At 1010, an output signal is generated by the PCA 360 and sent to the drive mechanism 305. At 1015, the drive mechanism 305 operates to stop movement of the transfer arm 110. At 1020, the transfer arm 110 moves away from its target and the crash detection mechanism 325 is reset (i.e., the connection between the pins 355 and the probe 210 is re-established). According to an embodiment, an automated inspection and alignment method may follow, to determine if the probe 210 is damaged and/or needs to be re-aligned. At 1025, the transfer arm 110/probe 210 are moved to an alignment block with an alignment verification hole, where the probe 210 is lowered to identify if the probe 210 is damaged and/or misaligned.

At 1035, if no collision is detected at 1030, the transfer arm 110/probe 210 are moved to a parking port to verify that the probe 210 is not radically bent. If a collision is detected at 1040, this serves as an indication that the probe 210 needs to be repaired, and an error signal is generated and sent (1050), and operation is halted. However, if a collision is not detected at 1040, this serves as an indication that the probe 210 is not damaged and/or misaligned, and normal operation is resumed (1045). If, however, a collision is detected at 1030, this may indicate that the probe 210 is misaligned. At 1055, the edges of the alignment verification hole are used to realign the probe 210 to the edge, as described above with respect to the alignment methods shown in FIGS. 9A, 9B, and 9C.

At 1060, after the realignment process, the transfer arm 110/probe 210 are again moved to an alignment block with an alignment verification hole, where the probe 210 is again lowered to identify if the realignment of the probe 210 was sufficient to continue normal operation. If no collision is detected at 1065, the transfer arm 110/probe 210 are moved to the parking port at 1035 to verify that the probe 210 is not radically bent, and the operations at 1040 and 1045/1050 are performed as described above. If, however, a collision is detected at 1065, this serves as an indication that the probe 210 is damaged and needs to be repaired. An error signal is generated at 1050, and operation is stopped.

Figure 11:
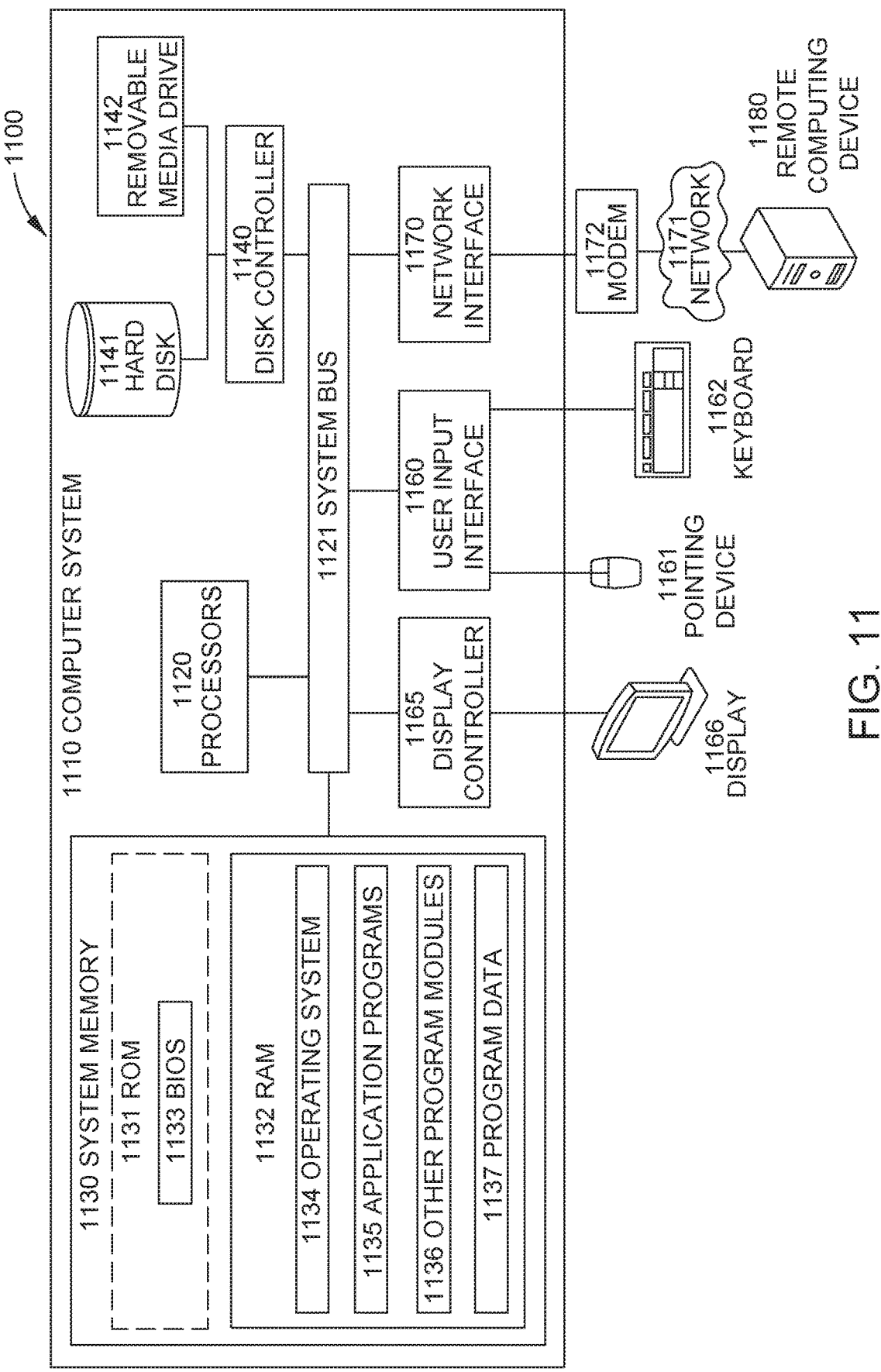
FIG. 11 illustrates an exemplary computing environment within which embodiments of the invention may be implemented.

FIG. 11 illustrates an exemplary computing environment 1100 within which embodiments of the invention may be implemented. Computing environment 1100 may include computer system 1110, which is one example of a general purpose computing system upon which embodiments of the invention may be implemented. Computers and computing environments, such as computer 1110 and computing environment 1100, are known to those of skill in the art and thus are described briefly here.

As shown in FIG. 11, the computer system 1110 may include a communication mechanism such as a bus 1121 or other communication mechanism for communicating information within the computer system 1110. The system 1110 further includes one or more processors 1120 (such as the controller described above, configured to control operation of the various components, including the probes, the turntables, and the rings) coupled with the bus 1121 for processing the information. The processors 1120 may include one or more central processing units (CPUs), graphical processing units (GPUs), or any other processor known in the art.

The computer system 1110 also includes a system memory 1130 coupled to the bus 1121 for storing information and instructions to be executed by processors 1120. The system memory 1130 may include computer readable storage media in the form of volatile and/or nonvolatile memory, such as read only memory (ROM) 1131 and/or random access memory (RAM) 1132. The system memory RAM 1132 may include other dynamic storage device(s) (e.g., dynamic RAM, static RAM, and synchronous DRAM). The system memory ROM 1131 may include other static storage device(s) (e.g., programmable ROM, erasable PROM, and electrically erasable PROM). In addition, the system memory 1130 may be used for storing temporary variables or other intermediate information during the execution of instructions by the processors 1120. A basic input/output system (BIOS) 1133 containing the basic routines that help to transfer information between elements within computer system 1110, such as during start-up, may be stored in ROM 1131. RAM 1132 may contain data and/or program modules that are immediately accessible to and/or presently being operated on by the processors 1120. System memory 1130 may additionally include, for example, operating system 1134, application programs 1135, other program modules 1136 and program data 1137.

The computer system 1110 also includes a disk controller 1140 coupled to the bus 1121 to control one or more storage devices for storing information and instructions, such as a magnetic hard disk 1141 and a removable media drive 1142 (e.g., floppy disk drive, compact disc drive, tape drive, and/or solid state drive). The storage devices may be added to the computer system 1110 using an appropriate device interface (e.g., a small computer system interface (SCSI), integrated device electronics (IDE), Universal Serial Bus (USB), or FireWire).

The computer system 1110 may also include a display controller 1165 coupled to the bus 1121 to control a display or monitor 1166, such as a cathode ray tube (CRT) or liquid crystal display (LCD), for displaying information to a computer user. The computer system 1110 includes an input interface 1160 and one or more input devices, such as a keyboard 1162 and a pointing device 1161, for interacting with a computer user and providing information to the processors 1120. The pointing device 1161, for example, may be a mouse, a trackball, or a pointing stick for communicating direction information and command selections to the processors 1120 and for controlling cursor movement on the display 1166. The display 1166 may provide a touch screen interface which allows input to supplement or replace the communication of direction information and command selections by the pointing device 1161.

The computer system 1110 may perform a portion or all of the processing steps of embodiments of the invention in response to the processors 1120 executing one or more sequences of one or more instructions contained in a memory, such as the system memory 1130. Such instructions may be read into the system memory 1130 from another computer readable medium, such as a hard disk 1141 or a removable media drive 1142. The hard disk 1141 may contain one or more data-stores and data files used by embodiments of the present invention. Data-store contents and data files may be encrypted to improve security. The processors 1120 may also be employed in a multi-processing arrangement to execute the one or more sequences of instructions contained in system memory 1130. In alternative embodiments, hard-wired circuitry may be used in place of or in combination with software instructions. Thus, embodiments are not limited to any specific combination of hardware circuitry and software.

As stated above, the computer system 1110 may include at least one computer readable medium or memory for holding instructions programmed according embodiments of the invention and for containing data structures, tables, records, or other data described herein. The term "computer readable medium" as used herein refers to any medium that participates in providing instructions to the processors 1120 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 1141 or removable media drive 1142. Non-limiting examples of volatile media include dynamic memory, such as system memory 1130. Non-limiting examples of transmission media include coaxial cables, copper wire, and fiber optics, including the wires that make up the bus 1121. Transmission media may also take the form of acoustic or light waves, such as those generated during radio wave and infrared data communications.

The computing environment 1100 may further include the computer system 1110 operating in a networked environment using logical connections to one or more remote computers, such as remote computer 1180. Remote computer 1180 may be a personal computer (laptop or desktop), a mobile device, a server, a router, a network PC, a peer device or other common network node, and typically includes many or all of the elements described above relative to computer system 1110. When used in a networking environment, computer system 1110 may include modem 1172 for establishing communications over a network 1171, such as the Internet. Modem 1172 may be connected to system bus 1121 via user network interface 1170, or via another appropriate mechanism.

Network 1171 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 1110 and other computers (e.g., remote computing system 1180). The network 1171 may be wired, wireless or a combination thereof. Wired connections may be implemented using Ethernet, Universal Serial Bus (USB), RJ-11 or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 1171.

As described herein, the various systems, subsystems, agents, managers and processes can be implemented using hardware components, software components and/or combinations thereof.

Although the present invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A crash detection mechanism for use on a transfer arm in a clinical analyzer in an in vitro diagnostics (IVD) environment, the mechanism comprising:
    a crash detection printed circuit assembly (PCA) comprising a switch;
    a probe comprising a probe head; and
    a spring-loaded contact sensor assembly configured to secure the probe within the transfer arm and allow for an electrical connection between the switch and the probe during normal operation and an electrical disconnection upon contact of the probe with an obstruction, wherein the spring-loaded contact sensor assembly comprises:
        a probe holder configured to clamp to a top portion of the probe and move vertically with the probe,
        a fitting configured to thread into the probe holder to clamp the probe into the probe holder,
        one or more compression springs located between the probe holder and an underside portion of the transfer arm, wherein end portions of the one or more compression springs are located by corresponding spring posts protruding from the probe holder and the underside portion of the transfer arm, and
        a probe guide comprising a vertically-oriented bore through which the probe passes, wherein a surface of the probe guide perpendicular to the bore mounts to an underside portion of the transfer arm,
        wherein the probe holder is configured to travel vertically above the probe guide as the probe slides vertically through the probe guide, and
        wherein the probe holder is forced downward against the probe guide by the one or more compression springs;
    wherein the PCA is configured to send a signal to a drive mechanism upon the electrical disconnection between the switch and the probe; and
    wherein the drive mechanism operates to stop movement of the transfer arm upon receipt of the signal from the PCA.

2. The crash detection mechanism of claim 1, wherein the switch comprises at least one spring-loaded pin.

3. The crash detection mechanism of claim 1, wherein the switch comprises an optical sensor.

4. The crash detection mechanism of claim 1, wherein the switch comprises a Hall effect sensor.

5. The crash detection mechanism of claim 1, wherein the transfer arm comprises a horizontally-extending chassis and a shaft oriented substantially perpendicular to the chassis, the chassis and the shaft coupled to one another by a coupler at a rear portion of the transfer arm;
    wherein the drive mechanism is coupled to the shaft; and
    wherein the PCA is mounted within an underside portion of the chassis.

6. A crash detection mechanism for use on a transfer arm in a clinical analyzer in an in vitro diagnostics (IVD) environment, the mechanism comprising:
    a crash detection printed circuit assembly (PCA) comprising a switch;
    a probe comprising a probe head; and
    a spring-loaded contact sensor assembly configured to secure the probe within the transfer arm and allow for an electrical connection between the switch and the probe during normal operation and an electrical disconnection upon contact of the probe with an obstruction, wherein the spring-loaded contact sensor assembly comprises:
        a probe holder configured to clamp to a top portion of the probe and move vertically with the probe,
        a fitting configured to thread into the probe holder to clamp the probe into the probe holder,
    one or more pairs of magnets to further secure the probe holder and the probe guide to one another,
        one or more compression springs located between the probe holder and an underside portion of the transfer arm, and
        a probe guide comprising a vertically-oriented bore through which the probe passes, wherein a surface of the probe guide perpendicular to the bore mounts to an underside portion of the transfer arm,
        wherein the probe holder is configured to travel vertically above the probe guide as the probe slides vertically through the probe guide, and
        wherein the probe holder is forced downward against the probe guide by the one or more compression springs;
    wherein the PCA is configured to send a signal to a drive mechanism upon the electrical disconnection between the switch and the probe;

wherein the drive mechanism operates to stop movement of the transfer arm upon receipt of the signal from the PCA.

7. A crash detection mechanism for use on a transfer arm in a clinical analyzer in an in vitro diagnostics (IVD) environment, the mechanism comprising:
a crash detection printed circuit assembly (PCA) comprising a switch, the switch comprising at least one spring-loaded pin;
a probe comprising a probe head; and
a spring-loaded contact sensor assembly configured to secure the probe within the transfer arm and allow for an electrical connection between the switch and the probe during normal operation and an electrical disconnection upon contact of the probe with an obstruction, wherein the spring-loaded contact sensor assembly comprises:
a probe holder configured to clamp to a top portion of the probe and move vertically with the probe,
a fitting configured to thread into the probe holder to clamp the probe into the probe holder,
one or more compression springs located between the probe holder and an underside portion of the transfer arm, and
a probe guide comprising a vertically-oriented bore through which the probe passes, wherein a surface of the probe guide perpendicular to the bore mounts to an underside portion of the transfer arm,
wherein the probe holder is configured to travel vertically above the probe guide as the probe slides vertically through the probe guide, and
wherein the probe holder is forced downward against the probe guide by the one or more compression springs;
wherein during normal operation the probe head compresses the at least one spring-loaded pin downward with force from the one or more compression springs and the underside portion of the transfer arm;
wherein the PCA is configured to send a signal to a drive mechanism upon the electrical disconnection between the switch and the probe;
wherein the drive mechanism operates to stop movement of the transfer arm upon receipt of the signal from the PCA.

8. The crash detection mechanism of claim 7, wherein the at least one spring-loaded pin are lifted off of the probe by compression of the one or more compression springs if a vertical motion of the probe is halted, thereby breaking electrical contact between the probe and at least one spring-loaded pin.

9. A crash detection mechanism for use on a transfer arm in a clinical analyzer in an in vitro diagnostics (IVD) environment, the mechanism comprising:
a crash detection printed circuit assembly (PCA) comprising a switch;
a probe comprising a probe head comprising a set of electrically isolated surfaces, and wherein the probe further comprises a primary tube nested within a secondary tube, the primary tube comprising a fluid passageway extending a length of the primary tube to contain fluid therein, wherein the primary tube and the secondary tube comprise respective heads at respective top portions thereof forming the set of electrically isolated surfaces; and
a spring-loaded contact sensor assembly configured to secure the probe within the transfer arm and allow for an electrical connection between the switch and the probe during normal operation and an electrical disconnection upon contact of the probe with an obstruction, wherein the spring-loaded contact sensor assembly comprises:
a probe holder configured to clamp to a top portion of the probe and move vertically with the probe,
a fitting configured to thread into the probe holder to clamp the probe into the probe holder,
one or more compression springs located between the probe holder and an underside portion of the transfer arm, and
a probe guide comprising a vertically-oriented bore through which the probe passes, wherein a surface of the probe guide perpendicular to the bore mounts to an underside portion of the transfer arm,
wherein the probe holder is configured to travel vertically above the probe guide as the probe slides vertically through the probe guide, and
wherein the probe holder is forced downward against the probe guide by the one or more compression springs;
wherein the PCA is configured to send a signal to a drive mechanism upon the electrical disconnection between the switch and the probe;
wherein the drive mechanism operates to stop movement of the transfer arm upon receipt of the signal from the PCA.

10. A system for detecting a collision in a clinical analyzer in an in vitro diagnostics (IVD) environment, the system comprising:
a transfer arm comprising a horizontally-extending chassis and a shaft oriented substantially perpendicular to the chassis, the chassis and the shaft coupled to one another by a coupler at a rear portion of the transfer arm;
a drive mechanism coupled to the shaft, the drive mechanism configured to control movement of the transfer arm; and
a crash detection mechanism housed within an underside portion of the chassis at a forward portion of the transfer arm, the crash detection mechanism comprising:
a crash detection printed circuit assembly (PCA) comprising a switch;
a probe comprising a probe head with a set of electrically isolated surfaces; and
a spring-loaded contact sensor assembly configured to secure the probe within the transfer arm and allow for an electrical connection between the switch and the probe during normal operation and an electrical disconnection upon contact of the probe with an obstruction;
wherein the PCA is configured to send a signal to the drive mechanism upon the electrical disconnection between the switch and the probe; and
wherein the drive mechanism operates to stop movement of the transfer arm upon receipt of the signal from the PCA.

11. The system of claim 10, wherein the spring-loaded contact sensor assembly comprises:
a probe holder configured to clamp to a top portion of the probe and move vertically with the probe, the probe holder comprising a gap at a portion corresponding to the set of electrically isolated surfaces of the probe;
a fitting configured to thread into the probe holder to clamp the probe into the probe holder;

one or more compression springs located between the probe holder and an underside portion of the chassis; and a probe guide comprising a vertically-oriented bore through which the probe passes, wherein a surface of the probe guide perpendicular to the bore mounts to an underside portion of the chassis;

wherein the probe holder is configured to travel vertically above the probe guide as the probe slides vertically through the probe guide; and wherein the probe holder is forced downward against the probe guide by the one or more compression springs.

12. The system of claim 11, wherein end portions of the one or more compression springs are located by corresponding spring posts protruding from the probe holder and the underside portion of the chassis.

13. The system of claim 11, further comprising:
one or more pairs of magnets to further secure the probe holder and the probe guide to one another.

14. The system of claim 11, wherein the switch comprises at least one spring-loaded pin.

15. The system of claim 14, wherein during normal operation the probe head compresses the at least one spring-loaded pin downward with force from the one or more compression springs and the underside portion of the chassis, and wherein the at least one spring-loaded pin are lifted off of the probe by compression of the one or more compression springs if a vertical motion of the probe is halted, thereby breaking electrical contact between the probe and the at least one spring-loaded pin.

16. The system of claim 11, wherein the switch comprises an optical sensor.

17. The system of claim 11, wherein the switch comprises a Hall effect sensor.

18. A method of detecting and responding to a collision in an in vitro diagnostics (IVD) environment, the method comprising:

detecting the collision between a probe comprising a probe head with a set of electrically isolated surfaces and an obstruction, the detecting performed by a crash detection mechanism comprising: a crash detection printed circuit assembly (PCA) comprising a switch; and a spring-loaded contact sensor assembly configured to secure the probe within a transfer arm and allow for an electrical connection between the switch and the probe during normal operation and an electrical disconnection upon contact of the probe with an obstruction; and generating and transmitting, by the crash detection mechanism, an output signal to a drive mechanism configured to control movement of the transfer arm.

19. The method of claim 18, further comprising resetting the crash detection mechanism to reestablish the electrical connection between the switch and the probe.

20. The method of claim 19, further comprising implementing an automated inspection method comprising:

moving, by the drive mechanism, the transfer arm to an alignment verification hole on an alignment block;

lowering, by the drive mechanism, the transfer arm to the alignment verification hole; and one of (i) implementing an automated alignment method upon detection, by the crash detection mechanism, of a secondary collision between the probe and a portion of the alignment verification hole or (ii) utilizing a larger verification hole, sized larger in diameter than the alignment verification hole, to verify the probe is not damaged if there is no secondary collision.

21. The method of claim 20, wherein the automated alignment method comprises:

aligning, by the crash detection mechanism, the probe to one or more targets to determine an offset required to allow the probe to enter the one or more targets; and applying the offset to aligned locations during normal operation.

22. The method of claim 21, wherein the automated alignment method further comprises:

after the aligning step, moving, by the drive mechanism, the transfer arm to the alignment verification hole on the alignment block to detect a conclusory collision;

lowering, by the drive mechanism, the transfer arm to the alignment verification hole;

one of (i) utilizing the larger verification hole to verify the probe is not damaged if there is no conclusory collision or (ii) sending an error signal and stopping operation upon the detection, by the crash detection mechanism, of the conclusory collision between the probe and the alignment verification hole.

23. The method of claim 20, further comprising one of (i) resuming operation if there is no collision with the larger verification hole or (ii) ending operation if there is a collision with the larger verification hole.

* * * * *